United States Patent
Ouchi et al.

(10) Patent No.: US 9,173,208 B2
(45) Date of Patent: Oct. 27, 2015

(54) MOBILE STATION APPARATUS, BASE STATION APPARATUS, METHOD AND INTEGRATED CIRCUIT

(75) Inventors: Wataru Ouchi, Osaka (JP); Yosuke Akimoto, Osaka (JP); Toshizo Nogami, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 184 days.

(21) Appl. No.: 13/883,382

(22) PCT Filed: Nov. 4, 2011

(86) PCT No.: PCT/JP2011/075372
§ 371 (c)(1),
(2), (4) Date: Jun. 19, 2013

(87) PCT Pub. No.: WO2012/060434
PCT Pub. Date: May 10, 2012

(65) Prior Publication Data
US 2013/0265962 A1 Oct. 10, 2013

(30) Foreign Application Priority Data

Nov. 5, 2010 (JP) .................................. 2010-248568

(51) Int. Cl.
*H04W 4/00* (2009.01)
*H04W 72/04* (2009.01)
*H04W 72/02* (2009.01)
*H04W 48/08* (2009.01)
*H04W 72/00* (2009.01)
*H04W 72/12* (2009.01)
*H04L 5/00* (2006.01)

(Continued)

(52) U.S. Cl.
CPC .......... *H04W 72/0406* (2013.01); *H04W 72/02* (2013.01); *H04L 5/0048* (2013.01); *H04L 25/0226* (2013.01); *H04W 28/18* (2013.01); *H04W 48/08* (2013.01); *H04W 72/00* (2013.01); *H04W 72/042* (2013.01); *H04W 72/12* (2013.01)

(58) Field of Classification Search
None
See application file for complete search history.

(56) References Cited

U.S. PATENT DOCUMENTS

2009/0046645 A1* 2/2009 Bertrand et al. .............. 370/329
2011/0090862 A1* 4/2011 Liang et al. ................... 370/329

FOREIGN PATENT DOCUMENTS

CN  WO2010012191  *  2/2010  ............ H04W 16/00

OTHER PUBLICATIONS

Motorola, "SRS for multiple antenna uplink", 3GPP TSG RAN WG1 Meeting #62bis, R1-10631, Xi'an, China, Oct. 11-15, 2010, pp. 1-2.*

(Continued)

*Primary Examiner* — Afshawn Towfighi
(74) *Attorney, Agent, or Firm* — Birch, Stewart, Kolasch & Birch, LLP

(57) ABSTRACT

To provide a mobile station apparatus, a base station apparatus, a method and an integrated circuit which are capable of dissolving complexity of setting by the base station apparatus and performing efficient scheduling by improving the orthogonality of resources of a reference signal for every antenna. A mobile station apparatus which transmits a sounding reference signal to a base station apparatus using a plurality of antenna ports, wherein based on one value set specifically to a mobile station apparatus by a parameter notified of by a higher layer from the base station apparatus, a cyclic shift applied to a sounding reference signal corresponding to the plurality of antenna ports is determined.

20 Claims, 12 Drawing Sheets

(51) Int. Cl.
 *H04L 25/02* (2006.01)
 *H04W 28/18* (2009.01)

(56) References Cited

OTHER PUBLICATIONS

3GPP TS 36.211, V9.1.0, "Physical Channels and Modulation", Release 9, Mar. 2010, pp. 1-85.
Ericsson, ST-Ericsson, "Further Details on SRS for Release 10", TSG-RAN WG1 #60bis, R1-101746, Beijing, China, Apr. 12-16, 2010, pp. 1-3.
Huawei, "Channel Sounding Capacity Improvements", 3GPP TSG RAN WG1 meeting #59 bis, R1-100808, Valencia, Spain, Jan. 18-22, 2010, pp. 1-7.
Motorola, "Aperiodic Srs for LTE-A", 3GPP TSG RAN1#60bis, R1-102114, Beijing, China, Apr. 12-16, 2010, pp. 1-2.
Motorola, "SRS for multiple transmit antenna uplink", 3GPP TSG RAN WG1 Meeting #62bis, R1-105631, Xi'an, China, Oct. 11-15, 2010, pp. 1-2.
PCT/ISA/210—International Search Report mailed on Jan. 24, 2012, issued in PCT/JP2011/075372.
Research in Motion, UK Limited, "Considerations on Remaining Design Details of Aperiodic SRS in LTE-A", 3GPP TSG RAN WG1 Meeting #62bis, R1-105507, Xi'an, China, Oct. 11-15, 2010, pp. 1-6.
Texas Instruments, "Resource Allocation and Signaling for Aperiodic Sounding", 3GPP TSG RAN WG1 #62bis, R1-105291, Xian, China, Oct. 11-15, 2010, pp. 1-4.

\* cited by examiner

*FIG. 8*

| | Comb#0 | Comb#1 | |
|---|---|---|---|
| C#0 | R#0 | R#8 | SRS RESOURCE GROUP#0 |
| C#1 | R#1 | R#9 | SRS RESOURCE GROUP#1 |
| C#2 | R#2 | R#10 | SRS RESOURCE GROUP#2 |
| C#3 | R#3 | R#11 | SRS RESOURCE GROUP#3 |
| C#4 | R#4 | R#12 | SRS RESOURCE GROUP#4 |
| C#5 | R#5 | R#13 | SRS RESOURCE GROUP#5 |
| C#6 | R#6 | R#14 | SRS RESOURCE GROUP#6 |
| C#7 | R#7 | R#15 | SRS RESOURCE GROUP#7 |

FIG. 9

| | Comb#0 | Comb#1 |
|---|---|---|
| C#0 | R#0 | R#8 |
| C#1 | R#1 | R#9 |
| C#2 | R#2 | R#10 |
| C#3 | R#3 | R#11 |
| C#4 | R#4 | R#12 |
| C#5 | R#5 | R#13 |
| C#6 | R#6 | R#14 |
| C#7 | R#7 | R#15 |

SRS RESOURCE GROUP#0
SRS RESOURCE GROUP#1
SRS RESOURCE GROUP#3
SRS RESOURCE GROUP#4

*FIG.10*

| | Comb#0 | Comb#1 |
|---|---|---|
| C#0 | R#0 | R#8 |
| C#1 | R#1 | R#9 |
| C#2 | R#2 | R#10 |
| C#3 | R#3 | R#11 |
| C#4 | R#4 | R#12 |
| C#5 | R#5 | R#13 |
| C#6 | R#6 | R#14 |
| C#7 | R#7 | R#15 |

SRS RESOURCE GROUP#0
SRS RESOURCE GROUP#1
SRS RESOURCE GROUP#3
SRS RESOURCE GROUP#4

FIG. 11

| | 2 PORTS | 4 PORTS |
|---|---|---|
| Normal CP | CODE DIVISION MULTIPLEXING | CODE DIVISION MULTIPLEXING |
| Extended CP | CODE DIVISION MULTIPLEXING | CODE DIVISION MULTIPLEXING + FREQUENCY MULTIPLEXING ON THE BASIS OF A FREQUENCY OFFSET OF COMB-SHAPED SPECTRUM(INTERLEAVED FREQUENCY DIVISION MULTIPLEXING) |

FIG. 12

| Tx antenna selection | Enabled | Disable |
|---|---|---|
| single antenna port mode | ON | OFF |
| multiple antenna port mode | OFF | OFF |

MOBILE STATION APPARATUS, BASE STATION APPARATUS, METHOD AND INTEGRATED CIRCUIT

TECHNICAL FIELD

The present invention relates to a mobile communication system and a communication method which include a base station apparatus and a mobile station apparatus.

BACKGROUND ART

3GPP (3rd Generation Partnership Project) is a project which performs investigation and preparation of a specification of a mobile communication system on the basis of a network where W-CDMA (Wideband-Code Division Multiple Access) and GSM (registered mark) (Global System for Mobile Communications) have been developed. In the 3GPP, the W-CDMA system has been standardized as a third generation cellular mobile communication system, and the services have been started successively. In addition, HSDPA (High-speed Downlink Packet Access) in which a transmission speed has been enhanced further has been also standardized, and the service has been started. In the 3GPP, investigation is promoted with respect to evolution of the third generation radio access technology (hereinafter, also referred to as "LTE (Long Term Evolution)" or "EUTRA (Evolved Universal Terrestrial Radio Access)") and a mobile communication system to realize a higher-speed data transmission and reception using a wider frequency band (hereinafter, also referred to as "LTE-A (Long Term Evolution-Advanced)" or "Advanced-EUTRA").

As a communication system in the LTE, an OFDMA (Orthogonal Frequency Division Multiple Access) system and an SC-FDMA (Single Carrier-Frequency Division Multiple Access) system in which user-multiplexing is performed using subcarriers which are mutually orthogonal is investigated. That is, in a downlink, the OFDMA system that is a multi-carrier communication system is proposed, and in an uplink, the SC-FDMA system that is a single-carrier communication system is proposed.

On the other hand, as a communication system in the LTE-A, it is investigated to introduce a Clustered-SC-FDMA system (also referred to as Clustered-Single Carrier-Frequency Division Multiple Access, DFT-S-OFDM with Spectrum Division Control and DFT-precoded OFDM) in addition to the OFDMA system in a downlink and the SC-FDMA system in an uplink. Here, in the LTE and LTE-A, the SC-FDMA system and Clustered-SC-FDMA system proposed as an uplink communication system have a characteristic feature that PAPR at the time of transmitting data (information) (Peak to Average power Ratio: a ratio of a peak power versus mean power, transmission power) can be suppressed to a low level in terms of the characteristic of the single-carrier communication system (single-carrier characteristic).

In addition, in the LTE-A, it is investigated that a mobile station apparatus transmits a reference signal (hereinafter, also referred to as a sounding reference signal, SRS) to a base station apparatus using an uplink in order for the base station apparatus to measure a channel of the uplink. A base station apparatus carries out scheduling of a mobile station apparatus based on the SRS transmitted from the mobile station apparatus, and for example, performs allocation of physical uplink shared channel (PUSCH)) resources and performs determination or the like of a modulation scheme and coding rate to be applied to the PUSCH.

With respect to transmission of an SRS by a mobile station apparatus, it is investigated that a base station apparatus instructs (request, trigger) a mobile station apparatus to perform transmission of aperiodic SRS (hereinafter, also referred to as A-SRS: Aperiodic SRS, Dynamic SRS, and Scheduled SRS) in addition to transmission of periodic SRS (hereinafter, also referred to as P-SRS: Periodic SRS) (Non-patent document 1, non-patent document 2).

PRIOR ART DOCUMENT

Non-patent document

Non-patent document 1: "Aperiodic SRS for LTE-A", 3GPP TSG RAN WG1 Meeting #60bis, R1-102114, Apr. 12-16, 2010. Non-patent document 2: "Further Details on SRS for Release 10", 3GPP TSG RAN WG1 Meeting #60bis, R1-101746, Apr. 12-16, 2010.

DISCLOSURE OF THE INVENTION

Summary of the Invention

Problems to be Solved by the Invention

However, in a conventional technology, there has been a problem that efficient scheduling cannot be performed by a base station apparatus since orthogonality of resources of a reference signal for every antenna has been insufficient. In addition, for enhancing the orthogonality, a base station apparatus needs to perform complicated parameter setting.

The present invention is accomplished in view of a situation like this, and the object is to provide a mobile station apparatus, a base station apparatus, a method and an integrated circuit which are capable of resolving complexity of setting by a base station apparatus and performing efficient scheduling by improving orthogonality of resources of a reference signal for every antenna.

Means for Solving the Problems (1) In order to achieve above-mentioned objects, the present invention has taken the following measures. That is, a mobile station apparatus of the present invention is the one that transmits a sounding reference signal to a base station apparatus using a plurality of antenna ports, wherein a cyclic shift applied to a sounding reference signal corresponding to the plurality of antenna ports is determined based on one value set specifically to the mobile station apparatus by a parameter notified of by a higher layer from the base station apparatus.

(2) A mobile station apparatus of the present invention is the one, wherein when one value set specifically to the mobile station apparatus is denoted by $n^{cs}_{SRS}$ ($n^{cs}_{SRS}$ is an integer of 0 to 7), and the number of the plurality of antenna ports is denoted by $N_p$, a value $n^{cs,p}_{SRS}$ set individually to the antenna port of an antenna port p among the plurality of antenna ports is shown by $$n^{cs,p}_{SRS} = \left( n^{cs}_{SRS} + \frac{8p}{N_p} \right) \bmod 8 \qquad \text{[Formula 1]}$$

and a cyclic shift α(p) individually set to an antenna port p is shown by $$\alpha(p) = 2\pi \frac{n_{SRS}^{cs,p}}{8}. \qquad \text{[Formula 2]}$$

(3) A mobile station apparatus of the present invention is the one, wherein when the length of a sequence of a sounding reference signal is denoted by N, n denotes an integer from 0 to N−1, and $r^0_{u,v}(n)$ denotes a reference sequence, a sequence of a sounding reference signal transmitted from an antenna port p: $r^{(\alpha(p))}_{u,v}(n)$ is shown by $$r_{u,v}^{(\alpha(p))}(n) = e^{j\alpha(p)n} r_{u,v}^{0}(n) \qquad \text{[Formula 3]}.$$

(4) A mobile station apparatus of the present invention is the one, wherein the sounding reference signal is transmitted using a frequency resource of a comb-shaped spectrum specified by a frequency offset value $k^p_{TC}$ corresponding to the plurality of antenna ports, and when $k_{TC}$ denotes a value set specifically to the mobile station apparatus specified by a parameter notified of by a higher layer from the base station apparatus, in the case of transmitting a sounding reference signal using four antenna ports, a frequency offset value $k^p_{TC}$ of a prescribed antenna port is shown by $$k_{TC}{}^p = k_{TC} \qquad \text{[Formula 4]}$$

and a frequency offset value $k^p_{TC}$ of antenna ports other than the above-mentioned prescribed antenna port is shown by $$k_{TC}{}^p = 1 - k_{TC} \qquad \text{[Formula 5]}.$$

(5) A mobile station apparatus of the present invention is the one, wherein in the case of transmitting a sounding reference signal using two antenna ports, a frequency offset value $k^p_{TC}$ of the two antenna ports is shown by $$k_{TC}{}^p = k_{TC} \qquad \text{[Formula 6]}.$$

(6) A base station apparatus of the present invention is the one that receives a sounding reference signal transmitted using a plurality of antenna ports from a mobile station apparatus, wherein the base station apparatus notifies, by a higher layer, of a parameter for setting one value specific to the mobile station apparatus used for determining a cyclic shift applied to a sounding reference signal corresponding to the plurality of antenna ports, in the mobile station apparatus.

(7) A base station apparatus of the present invention is the one, wherein the mobile station apparatus transmits information indicating an antenna port used for transmission of a sounding reference signal.

(8) A base station apparatus of the present invention is the one, wherein when one value set specifically to a mobile station by a parameter notified of to the mobile station apparatus by a higher layer is denoted by $n^{cs}_{SRS}$ ($n^{cs}_{SRS}$ is an integer of 0 to 7), and the number of the plurality of antenna ports is denoted by $N_p$, a value $n^{cs,p}_{SRS}$ set individually to the antenna port of an antenna port p among the plurality of antenna ports is shown by $$n_{SRS}^{cs,p} = \left( n_{SRS}^{cs} + \frac{8p}{N_p} \right) \mod 8 \qquad \text{[Formula 7]}$$

and a cyclic shift α(p) individually set to an antenna port p is shown by $$\alpha(p) = 2\pi \frac{n_{SRS}^{cs,p}}{8}. \qquad \text{[Formula 8]}$$

(9) A base station apparatus of the present invention is the one, wherein when the length of a sequence of a sounding reference signal is denoted by N, n denotes an integer from 0 to N−1, and $r^0_{u,v}(n)$ denotes a reference sequence, a sequence of a sounding reference signal transmitted from an antenna port p: $r^{(\alpha(p))}_{u,v}(n)$ is shown by $$r_{u,v}^{(\alpha(p))}(n) = e^{j\alpha(p)n} r_{u,v}^{0}(n) \qquad \text{[Formula 9]}.$$

(10) A base station apparatus of the present invention is the one, wherein the sounding reference signal is transmitted using a frequency resource of a comb-shaped spectrum specified by a frequency offset value $k^p_{TC}$ corresponding to the plurality of antenna ports, and when $k_{TC}$ denotes a value set specifically to a mobile station apparatus specified by a parameter which is notified of by a higher layer, in the case where a sounding reference signal is transmitted using four antenna ports, a frequency offset value $k^p_{TC}$ of a prescribed antenna port is shown by $$k_{TC}{}^p = k_{TC} \qquad \text{[Formula 10]}$$

and a frequency offset value $k^p_{TC}$ of antenna ports other than the above-mentioned prescribed antenna port is shown by $$k_{TC}{}^p = 1 - k_{TC} \qquad \text{[Formula 11]}.$$

(11) A base station apparatus of the present invention is the one, wherein in the case of transmitting a sounding reference signal using two antenna ports, a frequency offset value $k^p_{TC}$ of the two antenna ports is shown by $$k_{TC}{}^p = k_{TC} \qquad \text{[Formula 12]}.$$

(12) A method of the present invention is the method in a mobile station apparatus which transmits a sounding reference signal to a base station apparatus using a plurality of antenna ports, wherein a cyclic shift applied to a sounding reference signal corresponding to the plurality of antenna ports is determined based on one value set specifically to the mobile station apparatus by a parameter notified of by a higher layer from the base station apparatus.

(13) A method of the present invention is the one, wherein when one value set specifically to the mobile station apparatus is denoted by $n^{cs}_{SRS}$ ($n^{cs}_{SRS}$ is an integer of 0 to 7), and the number of the plurality of antenna ports is denoted by $N_p$, a value $n^{cs,p}_{SRS}$ set individually to the antenna port of an antenna port p among the plurality of antenna ports is shown by $$n_{SRS}^{cs,p} = \left( n_{SRS}^{cs} + \frac{8p}{N_p} \right) \mod 8 \qquad \text{[Formula 13]}$$

and a cyclic shift α(p) individually set to an antenna port p is shown by $$\alpha(p) = 2\pi \frac{n_{SRS}^{cs,p}}{8}. \qquad \text{[Formula 14]}$$

(14) A method of the present invention is the one, wherein when the length of a sequence of a sounding reference signal is denoted by N, n denotes an integer from 0 to N−1, and $r^0_{u,v}(n)$ denotes a reference sequence, a sequence of a sounding reference signal transmitted from an antenna port p: $r^{(\alpha(p))}_{u,v}(n)$ is shown by $$r_{u,v}^{(\alpha(p))}(n)=e^{j\alpha(p)n}r_{u,v}^0(n) \qquad \text{[Formula 15]}$$

(15) A method of the present invention is the one, wherein the sounding reference signal is transmitted using a frequency resource of a comb-shaped spectrum specified by a frequency offset value $k^p_{TC}$ corresponding to the plurality of antenna ports, and when $k_{TC}$ denotes a value set specifically to a mobile station apparatus specified by a parameter which is notified of by a higher layer from the base station apparatus, in the case of transmitting a sounding reference signal using four antenna ports, a frequency offset value $k^p_{TC}$ of a prescribed antenna port is shown by $$k_{TC}^p = k_{TC} \qquad \text{[Formula 16]}$$

and a frequency offset value $k^p_{TC}$ of antenna ports other than the above-mentioned prescribed antenna port is shown by $$k_{TC}^p = 1-k_{TC} \qquad \text{[Formula 17]}.$$

(16) A method of the present invention is the one, wherein in the case of transmitting a sounding reference signal using two antenna ports, a frequency offset value $k^p_{TC}$ of the two antenna ports is shown by $$k_{TC}^p = k_{TC} \qquad \text{[Formula 18]}.$$

(17) A method of the present invention is the one in a base station apparatus that receives a sounding reference signal transmitted using a plurality of antenna ports from a mobile station apparatus, wherein the base station apparatus notifies, by a higher layer, of a parameter for setting one value specific to the mobile station apparatus used for determining a cyclic shift applied to a sounding reference signal corresponding to the plurality of antenna ports, in the mobile station apparatus.

(18) A method of the present invention is the one, wherein the mobile station apparatus transmits information indicating an antenna port used for transmission of a sounding reference signal.

(19) A method of the present invention is the one, wherein when one value set specifically to a mobile station by a parameter notified of to the mobile station apparatus by a higher layer is denoted by $n^{cs}_{SRS}$ ($n^{cs}_{SRS}$ is an integer of 0 to 7), and the number of the plurality of antenna ports is denoted by $N_p$, a value $n^{cs,p}_{SRS}$ set individually to the antenna port of an antenna port p among the plurality of antenna ports is shown by $$n^{cs,p}_{SRS} = \left(n^{cs}_{SRS} + \frac{8p}{N_p}\right)\mathrm{mod}\, 8 \qquad \text{[Formula 19]}$$

and a cyclic shift α(p) individually set to an antenna port p is shown by $$\alpha(p) = 2\pi \frac{n^{cs,p}_{SRS}}{8}. \qquad \text{[Formula 20]}$$

(20) A method of the present invention is the one, wherein when the length of a sequence of a sounding reference signal is denoted by N, n denotes an integer from 0 to N−1, and $r^0_{u,v}(n)$ denotes a reference sequence, a sequence of a sounding reference signal transmitted from an antenna port p: $r^{(\alpha(p))}_{u,v}(n)$ is shown by $$r_{u,v}^{(\alpha(p))}(n)=e^{j\alpha(p)n}r_{u,v}^0(n) \qquad \text{[Formula 21]}.$$

(21) A method of the present invention is the one, wherein the sounding reference signal is transmitted using a frequency resource of a comb-shaped spectrum specified by a frequency offset value $k^p_{TC}$ corresponding to the plurality of antenna ports, and when $k_{TC}$ denotes a value set specifically to a mobile station apparatus specified by a parameter which is notified of to the mobile station apparatus by a higher layer, in the case where a sounding reference signal is transmitted using four antenna ports, a frequency offset value $k^p_{TC}$ of a prescribed antenna port is shown by $$k_{TC}^p = k_{TC} \qquad \text{[Formula 22]}$$

and a frequency offset value $k^p_{TC}$ of antenna ports other than the above-mentioned prescribed antenna port is shown by $$k_{TC}^p = 1-k_{TC} \qquad \text{[Formula 23]}.$$

(22) A method of the present invention is the one, wherein in the case of transmitting a sounding reference signal using two antenna ports, a frequency offset value $k^p_{TC}$ of the two antenna ports is shown by $$k_{TC}^p = k_{TC} \qquad \text{[Formula 24]}.$$

(23) An integrated circuit of the present invention is the one in a mobile station apparatus which transmits a sounding reference signal to a base station apparatus using a plurality of antenna ports, wherein a cyclic shift applied to a sounding reference signal corresponding to the plurality of antenna ports is determined based on one value set specifically to the mobile station apparatus by a parameter notified of by a higher layer from the base station apparatus.

(24) An integrated circuit of the present invention is the one, wherein when one value set specifically to a mobile station is denoted by $n^{cs}_{SRS}$ ($n^{cs}_{SRS}$ is an integer of 0 to 7), and the number of the plurality of antenna ports is denoted by $N_p$, a value $n^{cs,p}_{SRS}$ set individually to the antenna port of an antenna port p among the plurality of antenna ports is shown by $$n^{cs,p}_{SRS} = \left(n^{cs}_{SRS} + \frac{8p}{N_p}\right)\mathrm{mod}\, 8 \qquad \text{[Formula 25]}$$

and a cyclic shift α(p) individually set to an antenna port p is shown by $$\alpha(p) = 2\pi \frac{n^{cs,p}_{SRS}}{8}. \qquad \text{[Formula 26]}$$

(25) An integrated circuit of the present invention is the one, wherein when the length of a sequence of a sounding reference signal is denoted by N, n denotes an integer from 0 to N−1, and $r^0_{u,v}(n)$ denotes a reference sequence, a sequence of a sounding reference signal transmitted from an antenna port p: $r^{(\alpha(p))}_{u,v}(n)$ is shown by $$r_{u,v}^{(\alpha(p))}(n)=e^{j\alpha(p)n}r_{u,v}^0(n) \qquad \text{[Formula 27]}.$$

(26) An integrated circuit of the present invention is the one, wherein the sounding reference signal is transmitted using a frequency resource of a comb-shaped spectrum specified by a frequency offset value $k^p_{TC}$ corresponding to the plurality of antenna ports, and when $k_{TC}$ denotes a value set specifically to a mobile station apparatus specified by a parameter notified of by a higher layer from the base station apparatus, in the case of transmitting a sounding reference signal using four antenna ports, a frequency offset value $k^p{}_{TC}$ of a prescribed antenna port is shown by $$k_{TC}{}^p = k_{TC} \quad \text{[Formula 28]}$$

and a frequency offset value $k^p{}_{TC}$ of antenna ports other than the above-mentioned prescribed antenna port is shown by $$k_{TC}{}^p = 1 - k_{TC} \quad \text{[Formula 29]}.$$

(27) An integrated circuit of the present invention is the one, wherein in the case of transmitting a sounding reference signal using two antenna ports, a frequency offset value $k^p{}_{TC}$ of the two antenna ports is shown by $$k_{TC}{}^p = k_{TC} \quad \text{[Formula 30]}.$$

(28) An integrated circuit of the present invention is the one in a base station apparatus which receives a sounding reference signal transmitted using a plurality of antenna ports from a mobile station apparatus, wherein the base station apparatus notifies, by a higher layer, of a parameter for setting one value specific to the mobile station apparatus used for determining a cyclic shift applied to a sounding reference signal corresponding to the plurality of antenna ports, in the mobile station apparatus.

(29) An integrated circuit of the present invention is the one, wherein the mobile station apparatus transmits information indicating an antenna port used for transmission of a sounding reference signal.

(30) An integrated circuit of the present invention is the one, wherein when one value set specifically to a mobile station by a parameter notified of to the mobile station apparatus by a higher layer is denoted by $n^{cs}{}_{SRS}$ ($n^{cs}{}_{SRS}$ is an integer of 0 to 7), and the number of the plurality of antenna ports is denoted by $N_p$, a value $n^{cs,p}{}_{SRS}$ set individually to the antenna port of an antenna port p among the plurality of antenna ports is shown by $$n_{SRS}^{cs,p} = \left(n_{SRS}^{cs} + \frac{8p}{N_p}\right) \bmod 8 \quad \text{[Formula 31]}$$

and a cyclic shift α(p) individually set to an antenna port p is shown by

[Formula 32]
$$\alpha(p) = 2\pi \frac{n_{SRS}^{cs,p}}{8}.$$

(31) An integrated circuit of the present invention is the one, wherein when the length of a sequence of a sounding reference signal is denoted by N, n denotes an integer from 0 to N−1, and $r^0{}_{u,v}(n)$ denotes a reference sequence, a sequence of a sounding reference signal transmitted from an antenna port p: $r^{(\alpha(p))}{}_{u,v}(n)$ is shown by $$r_{u,v}^{(\alpha(p))}(n) = e^{j\alpha(p)n} r_{u,v}^{0}(n) \quad \text{[Formula 33]}.$$

(32) An integrated circuit of the present invention is the one, wherein the sounding reference signal is transmitted using a frequency resource of a comb-shaped spectrum specified by a frequency offset value $k^p{}_{TC}$ corresponding to the plurality of antenna ports, and when $k_{TC}$ denotes a value set specifically to a mobile station apparatus specified by a parameter notified of to the mobile station apparatus by a higher layer, in the case where a sounding reference signal is transmitted using four antenna ports, a frequency offet value $k^p{}_{TC}$ of a prescribed antenna port is shown by $$k_{TC}{}^p = k_{TC} \quad \text{[Formula 34]}$$

and a frequency offset value $k^p{}_{TC}$ of antenna ports other than the above-mentioned prescribed antenna port is shown by $$k_{TC}{}^p = 1 - k_{TC} \quad \text{[Formula 35]}.$$

(33) An integrated circuit of the present invention is the one, wherein in the case of transmitting a sounding reference signal using two antenna ports, a frequency offset value $k^p{}_{TC}$ of the two antenna ports is shown by $$k_{TC}{}^p = k_{TC} \quad \text{[Formula 36]}.$$

(34) A mobile station apparatus of the present invention is the one that communicates with a base station apparatus, wherein the mobile station apparatus notifies the base station apparatus of information which specifies the number of transmission ports, and sets a multiplexing method of a sounding reference signal for every the transmission port in accordance with the number of the transmission ports, and transmits the sounding reference signal multiplexed by using the multiplexing method.

(35) A mobile station apparatus of the present invention is the one, wherein in the case where the transmission ports are smaller than a prescribed value, the sounding reference signal is multiplexed by code multiplexing.

(36) A mobile station apparatus of the present invention is the one, wherein the sounding reference signal multiplexed using code multiplexing based on a cyclic shift is transmitted.

(37) A mobile station apparatus of the present invention is the one, wherein in the case where the transmission ports are larger than a prescribed value, the sounding reference signal is multiplexed by code multiplexing and frequency multiplexing.

Effect of the Invention

According to the present invention, complexity of setting by a base station apparatus is dissolved, and orthogonality of resources of a reference signal for every antenna is improved, and thereby, efficient scheduling can be performed.

BRIEF DESCRIPTION OF THE DRAWINGS

FIG. 8 is a diagram illustrating an example of an SRS resource group used for SRS transmission according to the embodiment;

FIG. 9 is a diagram illustrating another example of an SRS resource group used for SRS transmission according to the embodiment;

FIG. 10 is a diagram illustrating another example of an SRS resource group used for SRS transmission according to the embodiment;

FIG. 11 is a diagram illustrating an example of an SRS multiplexing method according to the embodiment; and FIG. 12 is a diagram illustrating an example of setting of a function of transmission antenna selection according to a second embodiment of the present invention.

BEST MODES FOR CARRYING OUT THE INVENTION (First Embodiment)

Figure 1:
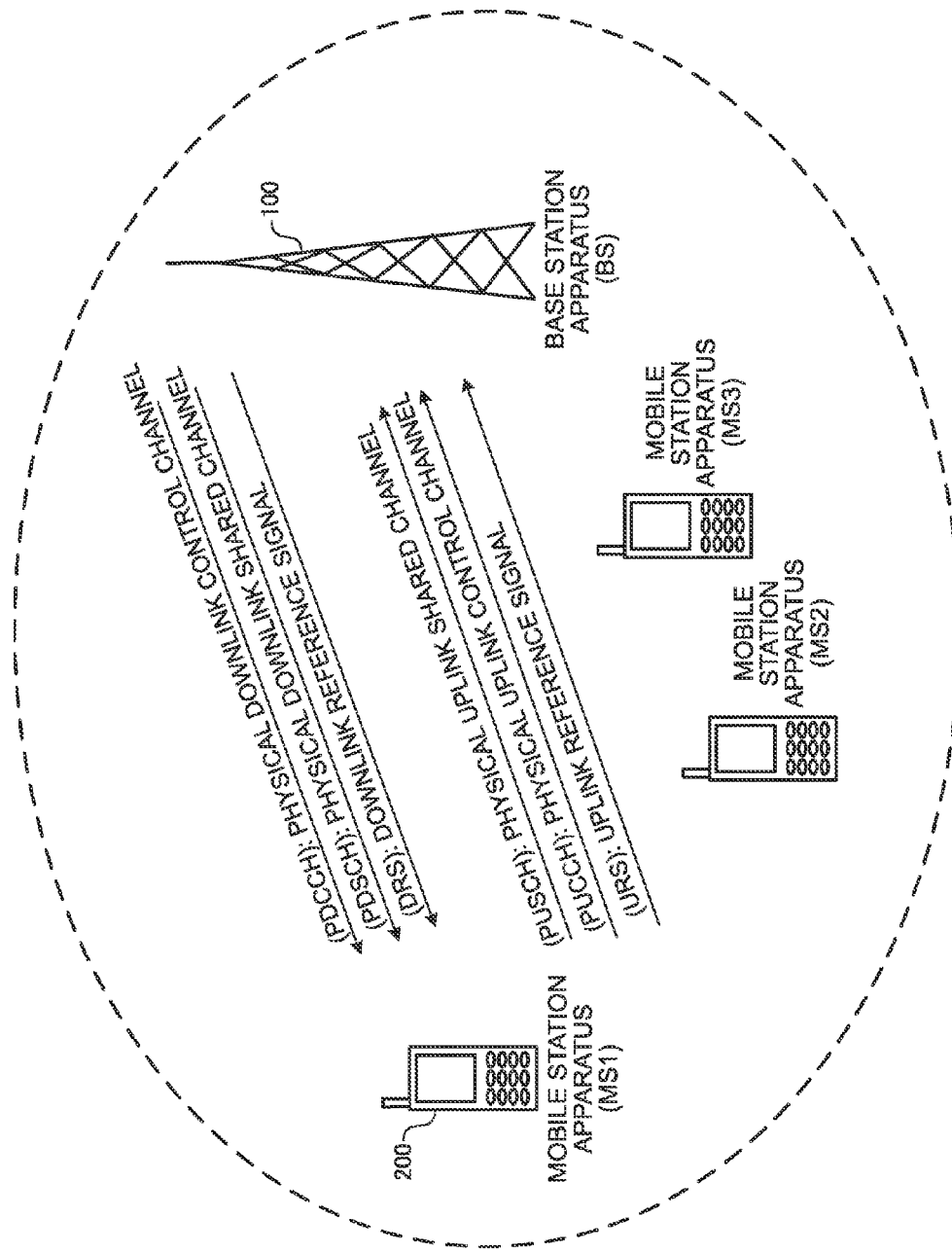
FIG. 1 is a diagram illustrating conceptually a structure of a physical channel according to a first embodiment of the present invention.

A first embodiment according to the present invention will be described referring to drawings. FIG. 1 is a diagram illustrating a structure example of a channel in a first embodiment of the present invention. A downlink physical channel includes a physical downlink control channel (PDCCH), and a physical downlink shared channel (PDSCH). An uplink physical channel includes a physical uplink shared channel (PUSCH), and a physical uplink control channel (PUCCH).

A base station apparatus 100 transmits a downlink reference signal (DRS, also referred to as a downlink pilot signal and a downlink pilot channel) to a mobile station apparatus 200. The mobile station apparatus 200 transmits an uplink reference signal (URS, also referred to as an uplink pilot signal and an uplink pilot channel) to the base station apparatus 100. The base station apparatus is also referred to as an enhanced Node B (eNB). The mobile station apparatus is also referred to as a user equipment (UE). Here, in an uplink reference signal, included is a demodulation reference signal (DMRS) which the base station apparatus 100 mainly uses for demodulating a PUCCH and/or a PUSCH. In addition, in an uplink reference signal, included is a sounding reference signal (SRS) which the base station apparatus 100 mainly uses for estimating a channel state of an uplink. Besides, an SRS may also be referred to as a sounding reference symbol.

A PDCCH is a channel used for notifying (specifying) to the mobile station apparatus 200 a resource allocation of a PDSCH, HARQ (Hybrid Automatic Repeat reQuest) processing information for downlink data, a resource allocation of a PUSCH or the like. A PDCCH is composed of a plurality of control channel elements (CCE), and the mobile station apparatus 200 receives a PDCCH from the base station apparatus 100 by detecting the PDCCH composed of the CCE. This CCE is composed of a plurality of resource element groups (REG, also referred to as a mini-CCE) distributed in a certain frequency and time domain. Here, the resource element is a unit resource composed of one OFDM symbol (time domain) and one subcarrier (frequency domain).

For downlink control information (DCI) transmitted by a PDCCH, a plurality of formats is defined. Hereinafter, a format of downlink control information is also referred to as a DCI format.

For example, as a DCI format for a downlink, defined are DCI formats 1/1A used when the base station apparatus 100 transmits a PDSCH by a transmission diversity system using one transmission antenna port or a plurality of transmission antenna ports. In addition, for example, as a DCI format for a downlink, defined is a DCI format 2 used when the base station apparatus 100 transmits a PDSCH by SM (Spatial Multiplexing) using MIMO (Multiple Input Multiple Output). Here, as for a DCI format, a plurality of DCI formats having the same number of bits and a plurality of DCI formats having the different number of bits can be defined. An antenna port is referred to as a port, a transmission antenna port or a transmission port.

For example, as a DCI format for an uplink, defined is a DCI format 0 used when the mobile station apparatus 200 transmits a PUSCH by one transmission antenna port. For example, as a DCI format for uplink scheduling, prepared is a DCI format 0A used when the mobile station apparatus 200 transmits a PUSCH by SM using MIMO.

For example, as a DCI format, defined is a DCI format used for group scheduling for a plurality of mobile station apparatuses 200. For example, as a DCI format, defined are DCI formats 3/3A including a plurality of TPC commands (Transmission Power Control Command) for a plurality of mobile station apparatuses 200. For example, the base station apparatus 100 notifies the mobile station apparatus 200 of an identifier and one index, and the mobile station apparatus 200 recognizes, as a TPC command addressed to the own apparatus, a TPC command corresponding to an index included in DCI formats 3/3A identified by an identifier notified of from the base station apparatus 100.

Here, the base station apparatus 100 may be able to notify the mobile station apparatus 200 of two identifiers in order to identify whether a TPC command notified of to the mobile station apparatus 200 using DCI formats 3/3A is a TPC command for a PUCCH or a command for a PUSCH (may be PUSCH and SRS). That is, the base station apparatus 100 can notify the mobile station apparatus 200 of one index per each of two identifiers. Here, in two identifiers notified of by the base station apparatus 100, the identifier applied to a DCI format in which a TPC command for a PUCCH is included is also referred to as a TPC-PUCCH-RNTI. The identifier applied to a DCI format in which a TPC command for a PUSCH (may be PUSCH and SRS) is included is also referred to as a TPC-PUSCH-RNTI.

DCI formats 3/3A used for a group scheduling for a plurality of mobile station apparatuses 200 need to be received (detected) by a plurality of mobile station apparatuses 200, and therefore, are arranged in a common search space (CSS) in which all the mobile station apparatuses 200 try searching (detecting) of a PDCCH. Here, a PDCCH addressed to a certain mobile station apparatus 200 is arranged in a mobile station apparatus specific search space (also referred to as USS: User equipment specific Search Space, UE specific Search Space) in which a certain mobile station apparatus 200 tries searching (detecting) of a PDCCH.

The base station apparatus 100 gives a cyclic redundancy check (CRC) code generated on the basis of DCI to a sequence scrambled by an RNTI (Radio Network Temporary Identifier) and transmits it to the mobile station apparatus 200. The mobile station apparatus 200 changes interpretation of the DCI according to the kind of RNTI the cyclic redundancy check code has been scrambled. For example, as for the DCI, the mobile station apparatus 200 determines that the DCI is DCI addressed to the own apparatus when the cyclic redundancy check code has been scrambled by a C-RNTI (Cell-Radio Network Temporary Identifier) allocated from the base station apparatus 100.

A PDCCH is separately encoded for every mobile station apparatus 200 and every type (also referred to as Separate Coding). That is, the mobile station apparatus 200 detects a plurality of PDCCHs, and acquires control information of a resource allocation of a downlink, a resource allocation of an uplink, and the others. To each PDCCH, a value of CRC (cyclic redundancy check) by which the format thereof can be identified has been given, and the mobile station apparatus 200 performs CRC for each set of CCEs which a PDCCH may be composed of, and acquires a PDCCH of which CRC has succeeded as a PDCCH addressed to the own apparatus. This is also referred to as blind decoding, and an area of a set of CCEs which a PDCCH in which the mobile station apparatus 200 performs the blind decoding may be composed of is referred to as a search space. That is, the mobile station apparatus 200 performs blind decoding for CCEs in the search space, and performs detection of a PDCCH addressed to the own apparatus.

The mobile station apparatus 200, when a resource allocation of a PDSCH is included in a PDCCH addressed to the own apparatus, receives a downlink signal (downlink data (a transport block for a downlink shared channel (DL-SCH)) and/or downlink control data (downlink control information) and/or a downlink reference signal (DRS)) using a PDSCH, in accordance with a resource allocation instructed by a PDCCH from the base station apparatus 100. That is, this PDCCH can be called to be a signal by which a resource allocation to a downlink is performed (hereinafter, also referred to as "downlink transmission permission signal", "downlink grant").

The mobile station apparatus 200, when a resource allocation of a PUSCH is included in a PDCCH addressed to the own apparatus, transmits an uplink signal (uplink data (a transport block for an uplink shared channel (UL-SCH)) and/or uplink control data (uplink control information) and/or an uplink reference signal (URS)) using a PUSCH, in accordance with a resource allocation instructed by a PDCCH from the base station apparatus 100. That is, this PDCCH can be called to be a signal which permits data transmission to an uplink (hereinafter, also referred to as "uplink transmission permission signal", "uplink grant").

A PDSCH is a channel used for transmitting downlink data (transport block for a downlink shared channel (DL-SCH)) or paging information (paging channel: PCH). The base station apparatus 100 transmits a downlink transport block (transport block for a downlink shared channel (DL-SCH)) to the mobile station apparatus 200 using a PDSCH allocated by a PDCCH.

Here, the downlink data is also user data, for example, and the DL-SCH is a transport channel. In the DL-SCH, HARQ and dynamic adaptive radio link control are supported, and beam-forming can be used. As for the DL-SCH, a dynamic resource allocation and a semi-static resource allocation are supported.

A PUSCH is a channel used for transmitting mainly uplink data (transport block for an uplink shared channel (UL-SCH)). The mobile station apparatus 200 transmits an uplink transport block (transport block for an uplink shared channel (UL-SCH)) to the base station apparatus 100 using a PUSCH allocated by a PDCCH transmitted from the base station apparatus 100. When the base station apparatus 100 carries out scheduling of the mobile station apparatus 200, uplink control information (UCI) is also transmitted using a PUSCH.

Here, the uplink data indicates user data, for example, and the UL-SCH is a transport channel. A PUSCH is a physical channel defined (constituted) by a time domain and a frequency domain. In the UL-SCH, HARQ and dynamic adaptive radio link control are supported, and beam forming can be used. As for the UL-SCH, a dynamic resource allocation and a semi-static resource allocation are supported.

Here, in the uplink data (UL-SCH) and the downlink data (DL-SCH), a radio resource control signal exchanged between the base station apparatus 100 and the mobile station apparatus 200 (hereinafter, referred to as "RRC signaling: Radio Resource Control Signaling") may be included. In the uplink data (UL-SCH) and the downlink data (DL-SCH), a MAC (Medium Access control) control element exchanged between the base station apparatus 100 and the mobile station apparatus 200 may be included.

The base station apparatus 100 and the mobile station apparatus 200 transmit and receive the RRC signaling in a higher layer (Radio Resource control layer). The base station apparatus 100 and the mobile station apparatus 200 transmit and receive a MAC control element in a higher layer (MAC: Medium Access control layer).

A PUCCH is a channel used for transmitting uplink control information (UCI). Here, in the uplink control information, included are channel state information (CSI), a channel quality identifier (CQI), a pre-coding matrix identifier (PMI) and a rank identifier (RI). In the uplink control information, information indicating ACK/NACK in HARQ for a downlink transport block is included. In the uplink control information, included is a scheduling request which requests (requests transmission by a UL-SCH) a resource allocation for the mobile station apparatus 200 to transmit uplink data.

[Configuration of Base Station Apparatus 100]

Figure 2:
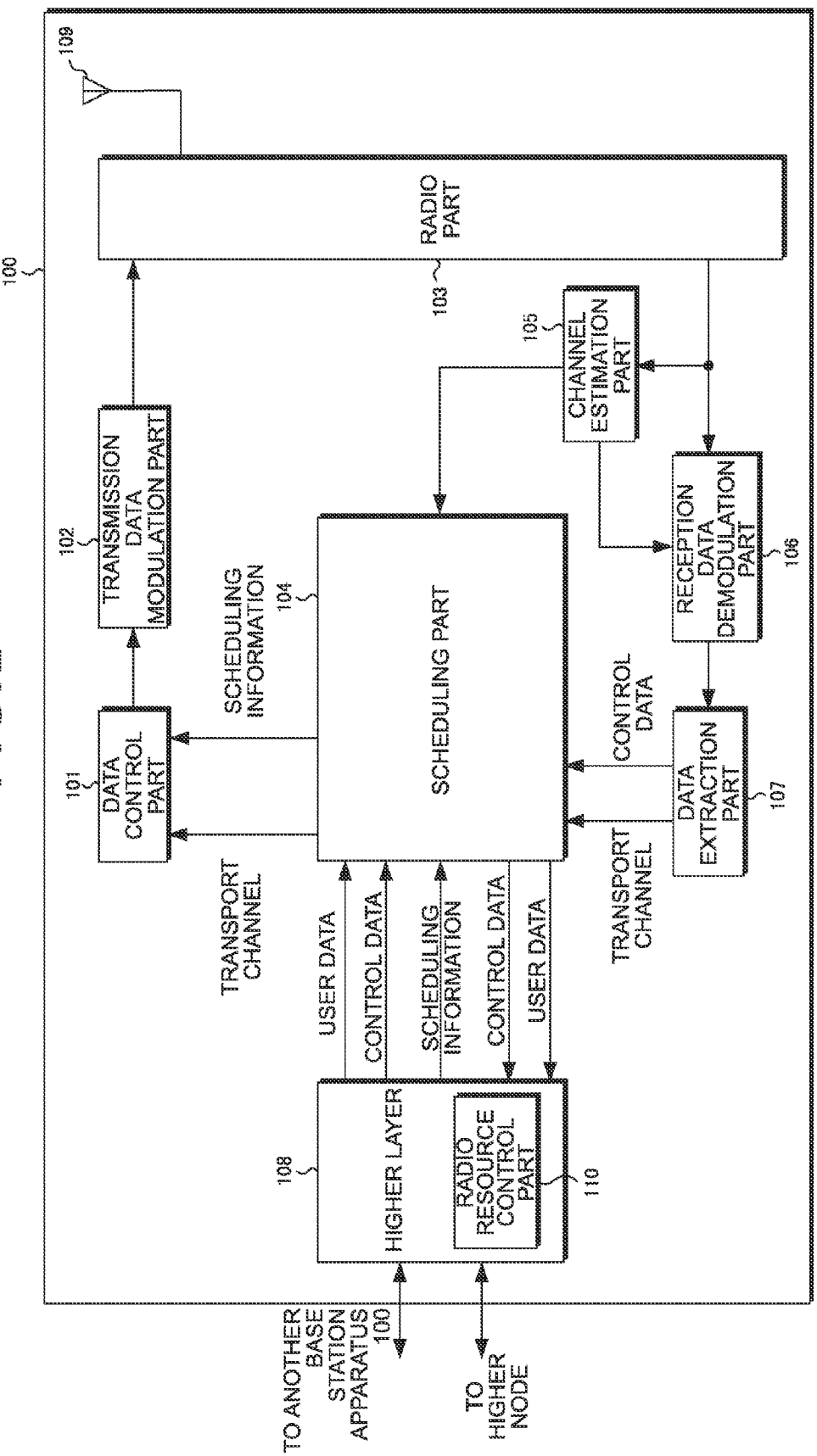
FIG. 2 is a block diagram illustrating a schematic structure of a base station apparatus according to the embodiment.

FIG. 2 is a block diagram illustrating a schematic structure of a base station apparatus 100 according to an embodiment of the present invention. The base station apparatus 100 includes; a data control part 101; a transmission data modulation part 102; a radio part 103; a scheduling section 104; a channel estimation part 105; a reception data demodulation part 106; a data extraction part 107; a higher layer 108, and an antenna 109. A reception section is composed of the radio part 103, the scheduling section 104, the channel estimation part 105, the reception data demodulation part 106, the data extraction part 107, the higher layer 108, and the antenna 109. A transmission section is composed of the data control part 101, the transmission data modulation part 102, the radio part 103, the scheduling section 104, the higher layer 108, and the antenna 109.

Processing of an uplink physical layer is performed by the antenna 109, the radio part 103, the channel estimation part 105, the reception data demodulation part 106, and the data extraction part 107. Processing of a downlink physical layer is performed by the antenna 109, the radio part 103, the transmission data modulation part 102, and the data control part 101.

The data control part 101 receives the transport channel from the scheduling section 104. The data control part 101 maps the transport channel, and a signal and channel generated by a physical layer, on the physical channel based on scheduling information input from the scheduling section 104. Each data mapped as mentioned above is output to the transmission data modulation part 102.

The transmission data modulation part 102 modulates transmission data into an OFDM system. The transmission data modulation part 102 performs, on data input from the data control part 101, signal processing such as data modulation, encoding, serial/parallel conversion of an input signal, IFFT (Inverse Fast Fourier Transform) processing, CP (Cyclic Prefix) insertion, and filtering, based on scheduling information from the scheduling section 104 and a modulation scheme and coding scheme corresponding to each PRB, generates transmission data, and outputs it to the radio part 103. Here, in the scheduling information, downlink physical resource block PRB (Physical Resource Block) allocation information, for example, physical resource block position information composed of frequency and time is included. In a modulation scheme and coding scheme corresponding to each PRB, information such as a modulation scheme: a 16 QAM, a coding rate: a 2/3 coding rate are included, for example.

The radio part 103 up-converts modulation data input from the transmission data modulation part 102 to a radio frequency to generate a radio signal, and transmits it to the mobile station apparatus 200 via the antenna 109. The radio part 103 receives an uplink radio signal from the mobile station apparatus 200 via the antenna 109, down-converts the received signal to a baseband signal, and output it to the channel estimation part 105 and the reception data demodulation part 106.

The scheduling section 104 performs processing of a medium access control (MAC) layer. The scheduling section 104 performs mapping between a logical channel and a transport channel, and scheduling of a downlink and uplink (HARQ processing, selection of a transport format, etc.) or the like. As for the scheduling section 104, for integrally controlling each physical layer processing part, an interface exists between the scheduling section 104 and each of the antenna 109, the radio part 103, the channel estimation part 105, the reception data demodulation part 106, the data control part 101, the transmission data modulation part 102 and the data extraction part 107 (however, not shown).

The scheduling section 104, in the scheduling of a downlink, based on an uplink signal received from the mobile station apparatus 200 (CSI, CQI, PMI, RI, information that indicates ACK/NACK for a downlink transport block, a scheduling request, and a reference signal etc.), information on PRB available for each mobile station apparatus 200, a buffer status, scheduling information input from the higher layer 108, and the like, performs selection processing of a downlink transport format for modulating each data (a transmission mode, that is, an allocation of a physical resource block and a modulation scheme and a coding scheme etc.), re-transmission control in HARQ, and generation of scheduling information used for a downlink. Scheduling information used for these downlink scheduling is output to the data control part 101.

The scheduling section 104, in the scheduling of an uplink, based on an estimation result of an uplink channel state (radio channel state) which the channel estimation part 105 outputs, a resource allocation request from the mobile station apparatus 200, information on the PRB available for each mobile station apparatus 200, scheduling information input from the higher layer 108, and the like, performs selection processing of a uplink transport format for modulating each data (a transmission mode, that is, an allocation of a physical resource block, a modulation scheme, a coding scheme and the like) and generation of scheduling information used for the scheduling of an uplink. Scheduling information used for these uplink scheduling is output to the data control part 101.

The scheduling section 104 carries out mapping of a downlink logical channel input from the higher layer 108 on a transport channel and outputs it to the data control part 101. The scheduling section 104 carries out mapping of control data and a transport channel acquired in an uplink input from the data extraction part 107 on an uplink logical channel after carrying out processing as necessary and outputs it to the higher layer 108.

The channel estimation part 105 estimates an uplink channel state from a DMRS for demodulating uplink data, and outputs the estimation result to the reception data demodulation part 106. In addition, for performing scheduling of an uplink, the channel estimation part 105 estimates an uplink channel state from an SRS to output the estimation result to the scheduling section 104.

The reception data demodulation part 106 doubles as an OFDM demodulation part which demodulates the received data modulated into an OFDM system and/or SC-FDMA system, and/or as a DFT-Spread-OFDM (DFT-S-OFDM) demodulation part. The reception data demodulation part 106, based on an uplink channel state estimation result input from the channel estimation part 105, performs signal processing such as DFT conversion, subcarrier mapping, IFFT conversion, filtering and the like, and carries out demodulation processing for modulation data input from the radio part 103 to output the resultant data to the data extraction part 107.

The data extraction part 107 confirms whether data input from the reception data demodulation part 106 is correct or incorrect to output the confirmation result (ACK or NACK) to the scheduling section 104. The data extraction part 107 separates data input from the reception data demodulation part 106 into a transport channel and control data of a physical layer to output the separated data to the scheduling section 104. In the separated control data, included are CSI, CQI, PMI and RI transmitted from the mobile station apparatus 200, information indicating ACK/NACK for a downlink transport block, a scheduling request, and the like.

The higher layer 108 performs processing of a packet data convergence protocol (PDCP) layer, a radio link control (RLC) layer, and a Radio resource control (RRC) layer. As for the higher layer 108, for integrally controlling a processing part of a lower layer, an interface exists between the higher layer 108 and each of the scheduling section 104, the antenna 109, the radio part 103, the channel estimation part 105, the reception data demodulation part 106, the data control part 101, the transmission data modulation part 102, and the data extraction part 107 (however, not shown). The higher layer 108 is composed of a plurality of layers.

The higher layer 108 has a radio resource control part 110 (also referred to as a control part). In addition, the radio resource control part 110 performs control of various setting information, control of system information, paging control, control of a communication state of each mobile station apparatus 200, movement control of hand-over or the like, control of a buffer status for every mobile station apparatus 200, control of connection setting of a unicast and multicast bearer, control of a mobile station identifier (UEID), and the like. The higher layer 108 delivers and receives information to and from another base station apparatus 100, and information to and from an upper node.

[Structure of Mobile Station Apparatus 200]

Figure 3:
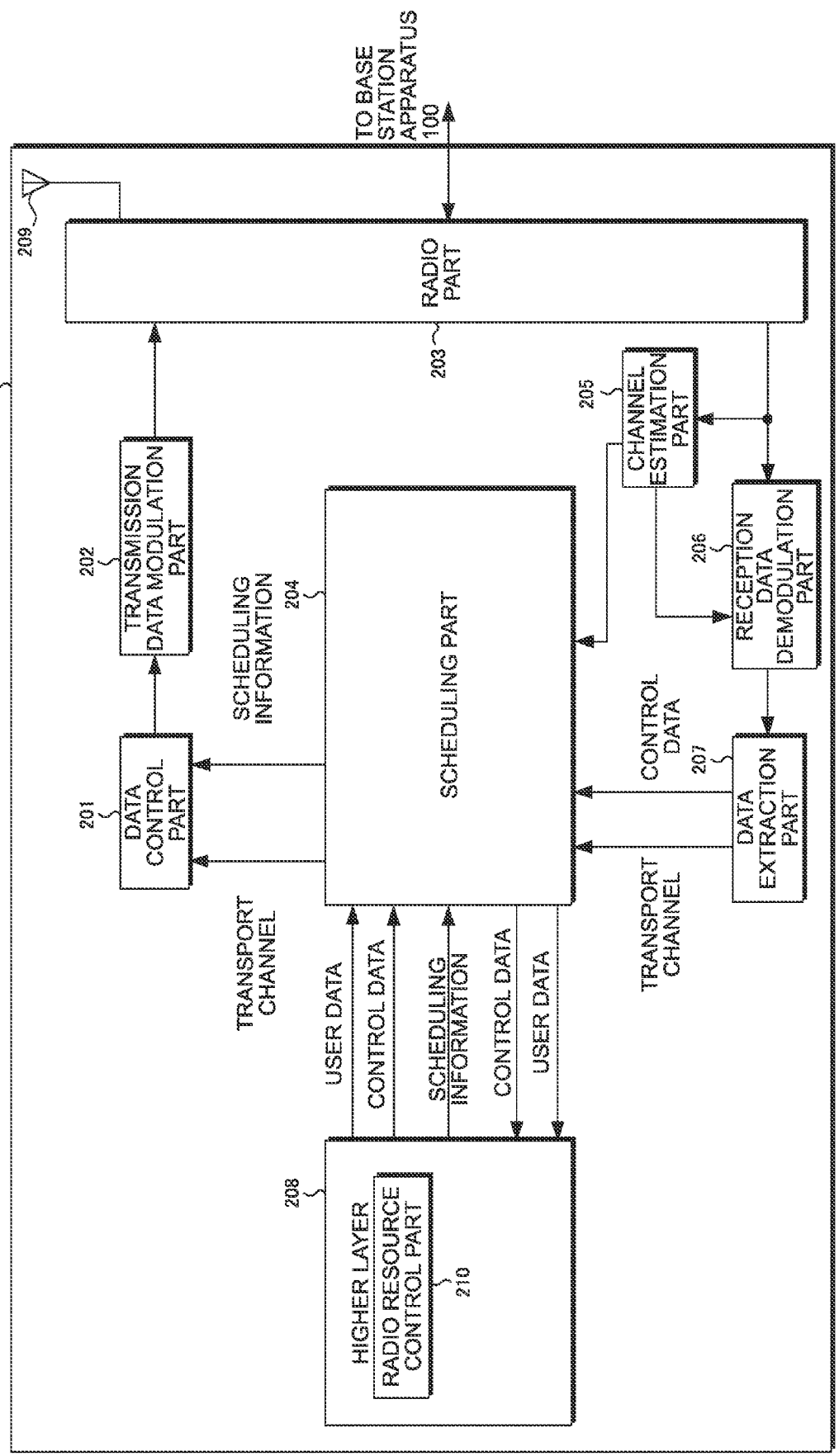
FIG. 3 is a block diagram illustrating a schematic structure of a mobile station apparatus according to the embodiment.

FIG. 3 is a block diagram illustrating a schematic structure of a mobile station apparatus 200 according to an embodiment of the present invention. The mobile station apparatus 200 includes: a data control part 201; a transmission data modulation part 202; a radio part 203; a scheduling section 204; a channel estimation part 205; a reception data demodulation part 206; a data extraction part 207; a higher layer 208; and an antenna 209.

A transmission section is composed of the data control part 201, the transmission data modulation part 202, the radio part 203, the scheduling section 204, the higher layer 208, and the antenna 209. A reception section is composed of the radio part 203, the scheduling section 204, the channel estimation part 205, the reception data demodulation part 206, the data extraction part 207, the higher layer 208, and the antenna 209.

By the data control part 201, the transmission data modulation part 202, and the radio part 203, processing of an uplink physical layer is performed. By the radio part 203, the channel estimation part 205, the reception data demodulation part 206, and the data extraction part 207, processing of a downlink physical layer is performed.

The data control part 201 receives a transport channel from the scheduling section 204. The data control part 201 maps a transport channel, and a signal and channel generated by a physical layer, on a physical channel based on scheduling information input from the scheduling section 204. Each data mapped as mentioned above is output to the transmission data modulation part 202.

The transmission data modulation part 202 modulates transmission data into an OFDM system and/or an SC-FDMA system. The transmission data modulation part 202, for data input from the data control part 201, performs signal processing of data modulation, DFT (discrete Fourier transform) processing, subcarrier mapping, IFFT (inverse fast Fourier transform) processing, CP insertion, filtering etc., and generates transmission data to output it to the radio part 203.

The radio part 203 up-converts modulation data input from the transmission data modulation part 202 to a radio frequency to generate a radio signal and transmits it to the base station apparatus 100 via the antenna 209. In addition, the radio part 203 receives via the antenna 209 a radio signal modulated by downlink data from the base station apparatus 100, down-converts it to a baseband signal, and outputs the received data to the channel estimation part 205 and the reception data demodulation part 206.

The scheduling section 204 performs processing of a medium access control (MAC) layer. The scheduling section 104 performs mapping between a logical channel and a transport channel, and scheduling of a downlink and uplink (HARQ processing, selection of a transport format, etc.) or the like. As for the scheduling section 204, for integrally controlling each processing part of physical layer, an interface exists between the scheduling section 204 and each of the antenna 209, the data control part 201, the transmission data modulation part 202, the channel estimation part 205, the reception data demodulation part 206, the data extraction part 207, and the radio part 203 (however, not shown).

The scheduling section 204, in scheduling of a downlink, based on scheduling information (a transport format and HARQ retransmission information) or the like from the base station apparatus 100 or the higher layer 208, performs reception control of a transport channel and a physical signal and a physical channel, HARQ re-transmission control and generation of scheduling information used for scheduling of a downlink. Scheduling information used for these downlink scheduling is output to the data control part 201.

The scheduling section 204, in scheduling of an uplink, based on an uplink buffer status input from the higher layer 208, uplink scheduling information from the base station apparatus 100 input from the data extraction part 207 (a transport format, HARQ retransmission information, etc.), scheduling information input from the higher layer 208, and the like, performs scheduling processing for mapping an uplink logical channel input from the higher layer 208 on a transport channel, and generation of scheduling information used for an uplink scheduling. Besides, with respect to an uplink transport format, information notified of from the base station apparatus 100 is used. These pieces of scheduling information are output to the data control part 201.

In addition, the scheduling section 204 maps an uplink logical channel input from the higher layer 208 on a transport channel and outputs it to the data control part 201. The scheduling section 204 outputs CSI, CQI, PMI, and RI which are input from the channel estimation part 205, and a CRC check confirmation result input from the data extraction part 207 also to the data control part 201. The scheduling section 204 maps, after processing as necessary, control data and a transport channel acquired by a downlink input from the data extraction part 207 on a downlink logical channel and outputs it to the higher layer 208.

The channel estimation part 205, for demodulating downlink data, estimates a downlink channel state from a demodulation reference signal, and outputs the estimation result to the reception data demodulation part 206. In addition, the channel estimation part 205, for notifying the base station apparatus 100 of the estimation result of a downlink channel state (radio channel state, CSI, CQI, PMI, RI), estimates a downlink channel state from a downlink reference signal, and outputs the estimation result to the scheduling section 204 as the CSI, CQI, PMI, and RI, for example.

The reception data demodulation part 206 demodulates received data modulated into an OFDM method. The reception data demodulation part 206, based on a downlink channel state estimation result input from the channel estimation part 205, carries out demodulation processing on modulation data input from the radio part 203, and outputs the resultant data to the data extraction part 207.

The data extraction part 207 confirms whether the data input from the reception data demodulation part 206 is correct or incorrect to output the confirmation result (information indicating ACK or NACK) to the scheduling section 204. The data extraction part 207 separates data input from the reception data demodulation part 206 into a transport channel and control data of a physical layer and output the separated data to the scheduling section 204. In the separated control data, included are scheduling information of a resource allocation of a downlink or an uplink, and HARQ control information of an uplink, or the like.

The higher layer 208 performs processing of a packet data convergence protocol (PDCP) layer, a radio link control (RLC) layer, and a radio resource control (RRC) layer. As for the higher layer 208, for integrally controlling a processing part of a lower layer, an interface exists between the higher layer 208 and each of the scheduling section 204, the antenna 209, the data control part 201, the transmission data modulation part 202, the channel estimation part 205, the reception data demodulation part 206, the data extraction part 207, and the radio part 203 (however, not shown). The higher layer 208 is composed of a plurality of layers.

The higher layer 208 has a radio resource control part 210 (also referred to as a control part). The radio resource control part 210 performs control of various setting information, control of system information, paging control, control of a communication state of its own station, movement control of hand-over or the like, control of a buffer status, control of a connection setting of a unicast and multicast bearer, and control of a mobile station identity (UEID).

Figure 4:
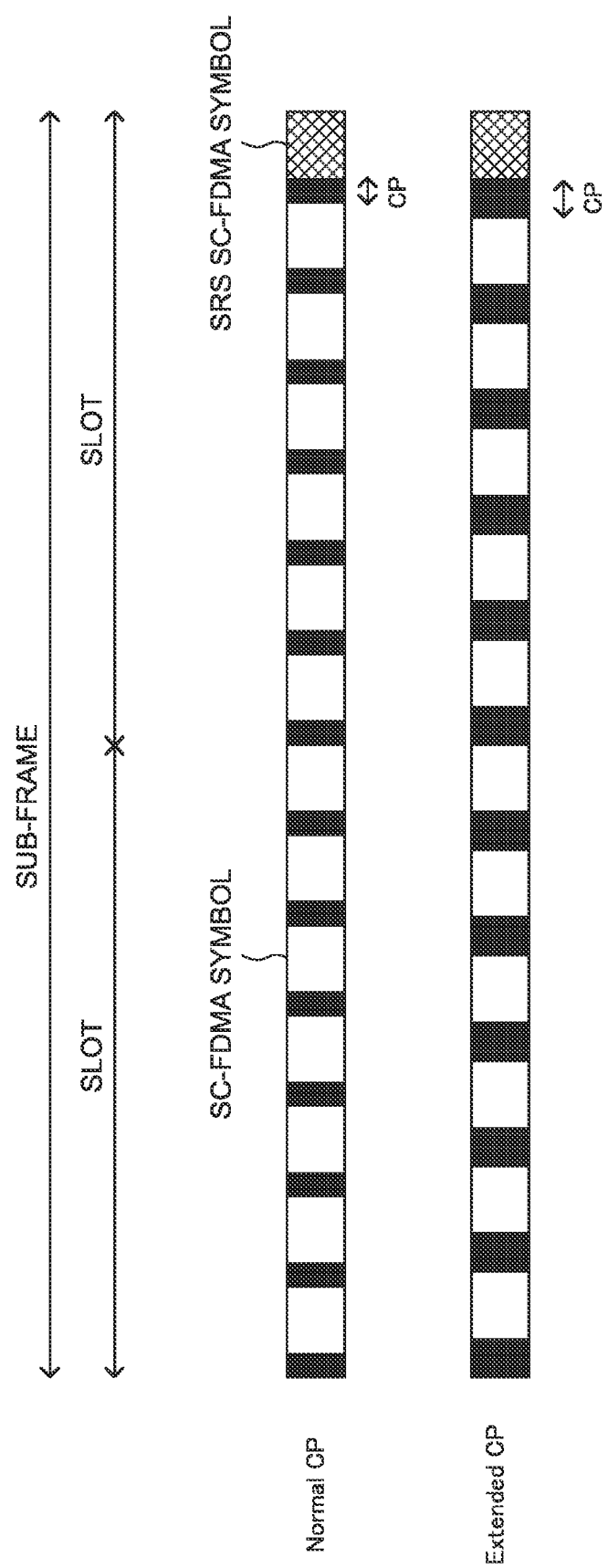
FIG. 4 is a diagram illustrating an example of an uplink sub-frame structure according to the embodiment.

FIG. 4 is a diagram illustrating a sub-frame structure of an uplink. One sub-frame includes two slots. The sub-frame structure can be classified into a Normal CP sub-frame and an Extended CP sub-frame, and it can be set for every cell which sub-frame structure is used. The Normal CP sub-frame has 14 SC-FDMA symbols per sub-frame. The Extended CP sub-frame has 12 SC-FDMA symbols per sub-frame. Accordingly, the Extended CP sub-frame has a low maximum transmission rate in comparison with the Normal CP sub-frame. On the other hand, the length of the CP in the Extended CP sub-frame is longer than the length of the CP in the Normal CP sub-frame. Accordingly, the Extended CP sub-frame has resistance characteristic for a propagation delay more robust than the Normal CP sub-frame, and is generally used in circumstances where the propagation delay is large (circumstances where frequency selectivity is severe). An SRS is transmitted using a SC-FDMA symbol located in the last position of a sub-frame.

Figure 5:
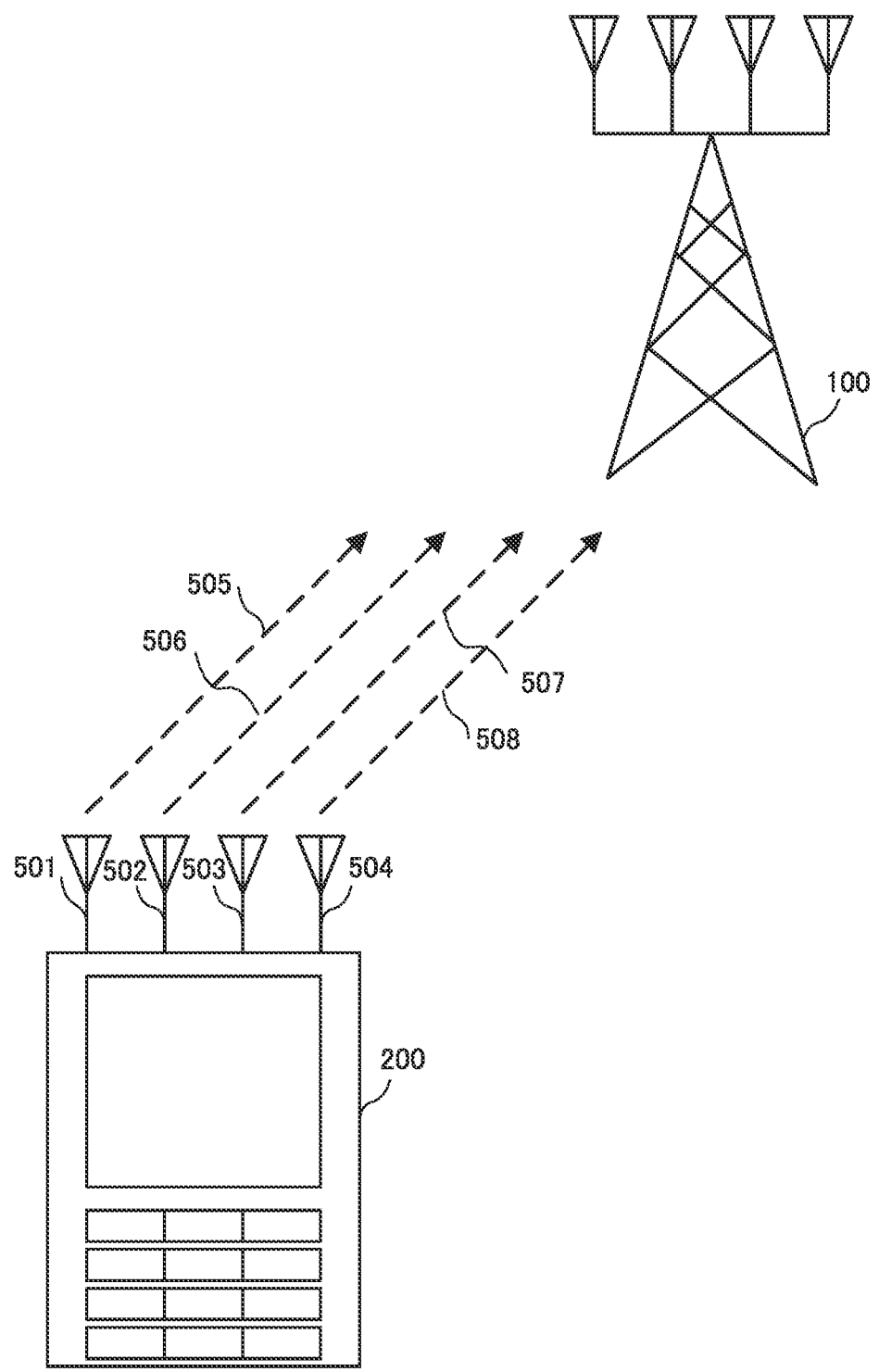
FIG. 5 is a diagram illustrating an example of uplink SRS transmission according to the embodiment.

FIG. 5 is a diagram illustrating an outline of SRS transmission of an uplink. The mobile station apparatus 200 transmits an SRS to the base station apparatus 100. This diagram illustrates the case where the mobile station apparatus 200 has antennas 501 to 504 which are four transmission antennas (a transmission antenna port or a logical port used for transmission). However, this is an example, and the number of transmission antennas can also be set individually for every mobile station apparatus 200. For example, the mobile station apparatus 200 which has four transmission antennas, the mobile station apparatus 200 which has two transmission antennas, and the mobile station apparatus 200 which has one transmission antenna, can communicate with the same base station apparatus 100. The mobile station apparatus 200 transmits SRSs 505 to 508 which are individual SRSs, respectively, from four transmission antennas. Here, SRSs 505 to 508 are multiplexed using a method of CDM (Code Division Multiplex), IFDM (Interleaved Frequency Division Multiplex) or FDM (Frequency Division Multiplex), TDM (Time Division Multiplex), or the like. Details of a multiplexing method of the SRS will be described later.

Figure 6:
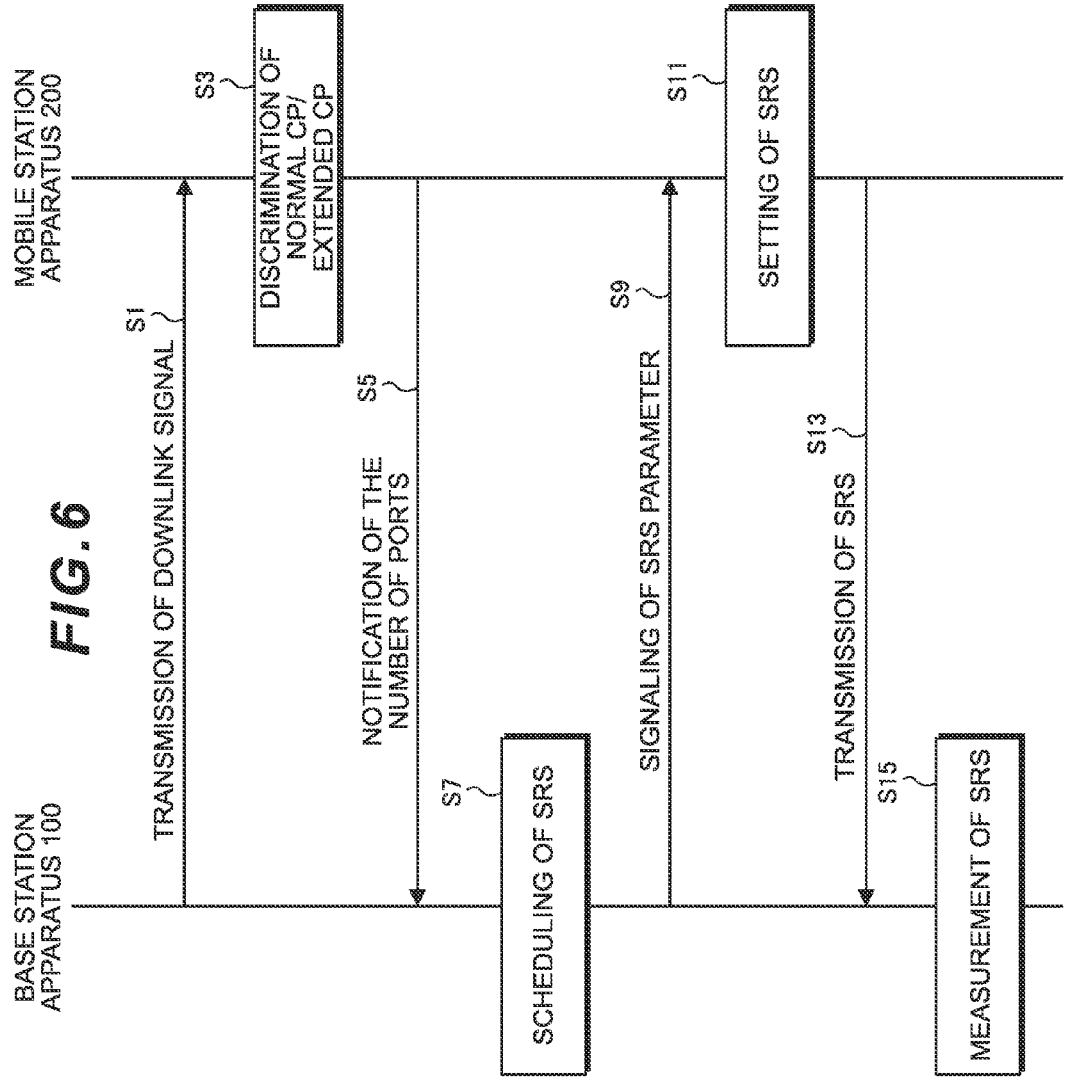
FIG. 6 is a diagram illustrating an example of a procedure of uplink SRS transmission according to the embodiment.

FIG. 6 is a diagram illustrating a procedure of SRS transmission of an uplink. The base station apparatus 100 transmits a downlink signal (Step S1). The mobile station apparatus 200 receives the downlink signal which the base station apparatus 100 transmits, and discriminates whether a sub-frame structure of the base station apparatus 100 is a Normal CP sub-frame or an Extended CP sub-frame (Step S3).

Then, the mobile station apparatus 200 notifies of the number of ports explicitly or implicitly (Step S5). As a method to notify explicitly, while a field for notification of the number of ports is provided in signaling in a higher layer, such as an RRC signaling, for example, the notification is carried out using this field. As a method to notify implicitly, the notification is carried out by being associated with UE Capability which is an index of terminal performance, for example. More specifically, while the number of transmission antennas is made to be associated one-to-one with the number of layers to be supported, the mobile station apparatus 200 may carry out notification of the number of layers to be supported as the UE Capability. Besides, until the notification of the number of ports from the mobile station apparatus 200 is completed, the base station apparatus 100 and the mobile station apparatus 200 communicate with each other, assuming that the mobile station apparatus 200 is the mobile station apparatus 200 which has one port. A case where the number of ports is fixed for every mobile station apparatus 200 will be described here, but it is not limited to this.

For example, the mobile station apparatus 200 can also select adaptively the number of ports for the SRS transmission. In this case, in a previous step of SRS scheduling, the mobile station apparatus 200 may notify the base station apparatus 100 of the number of ports for the SRS transmission.

The base station apparatus 100 which has received a notification of the number of ports performs SRS scheduling of the mobile station apparatus 200 (Step S7), and carries out signaling of SRS parameters to the mobile station apparatus 200 (Step S9). For example, signaling in a higher layer, such as an RRC signaling, can be used. The mobile station apparatus 200 performs setting of the SRS transmission based on SRS parameters signaled from the base station apparatus 100 (Step S11), and transmits the SRS (Step S13). The base station apparatus 100 measures the SRS transmitted from the mobile station apparatus 200. (Step S15), and estimates a channel state between the mobile station apparatus 200 and the base station apparatus 100.

Here, in the case of a procedure by which a P-SRS is transmitted as an SRS, in SRS parameters, i.e. P-SRS parameters, an interval (transmission period, periodicity) when the mobile station apparatus 200 transmits the P-SRS is included. In addition, in P-SRS parameters, included is a transmission bandwidth (SRS transmission bandwidth) for the mobile station apparatus 200 to transmit a P-SRS. In P-SRS parameters, included is information indicating a frequency allocation position indicating a frequency position at which a P-SRS is arranged. In P-SRS parameters, included is information for specifying a resource used for maintaining orthogonality among the mobile station apparatuses 200 or among signals. A P-SRS may be referred to as a trigger type 0 SRS (Type 0 triggered SRS).

Further preferably, in P-SRS parameters, included is the number of times of transmissions for completing transmission of a P-SRS or a transmission stop time. In P-SRS parameters, included is information indicating an antenna port for transmitting a P-SRS. In P-SRS parameters, included is plural antennas simultaneous transmission information indicating whether or not to perform transmission of a P-SRS using a plurality of antennas simultaneously like MIMO. In P-SRS parameters, a TPC command (transmission power control information) for a P-SRS is included.

Here, in the case of a procedure by which an A-SRS is transmitted as an SRS, in SRS parameters, i.e. A-SRS parameters, included is a transmission bandwidth (SRS transmission bandwidth) when the mobile station apparatus 200 transmits an A-SRS. In A-SRS parameters, included is information indicating a frequency domain position at which an A-SRS is allocated. An A-SRS may be also referred to as a trigger type 1 SRS (Type 1 triggered SRS).

Further preferably, in A-SRS parameters, included is information for specifying a resource used for maintaining orthogonality among the mobile station apparatuses 200 or among signals. In A-SRS parameters, included is the number of times of transmissions for expiring transmission of an A-SRS or a transmission stop time. In A-SRS parameters, included is information indicating an antenna port for transmitting an A-SRS. In A-SRS parameters, included is plural antennas simultaneous transmission information indicating whether or not to perform transmission of an A-SRS using a plurality of antennas simultaneously like MIMO. In A-SRS parameters, a TPC command (transmission power control information) for an A-SRS is included.

Figure 7:
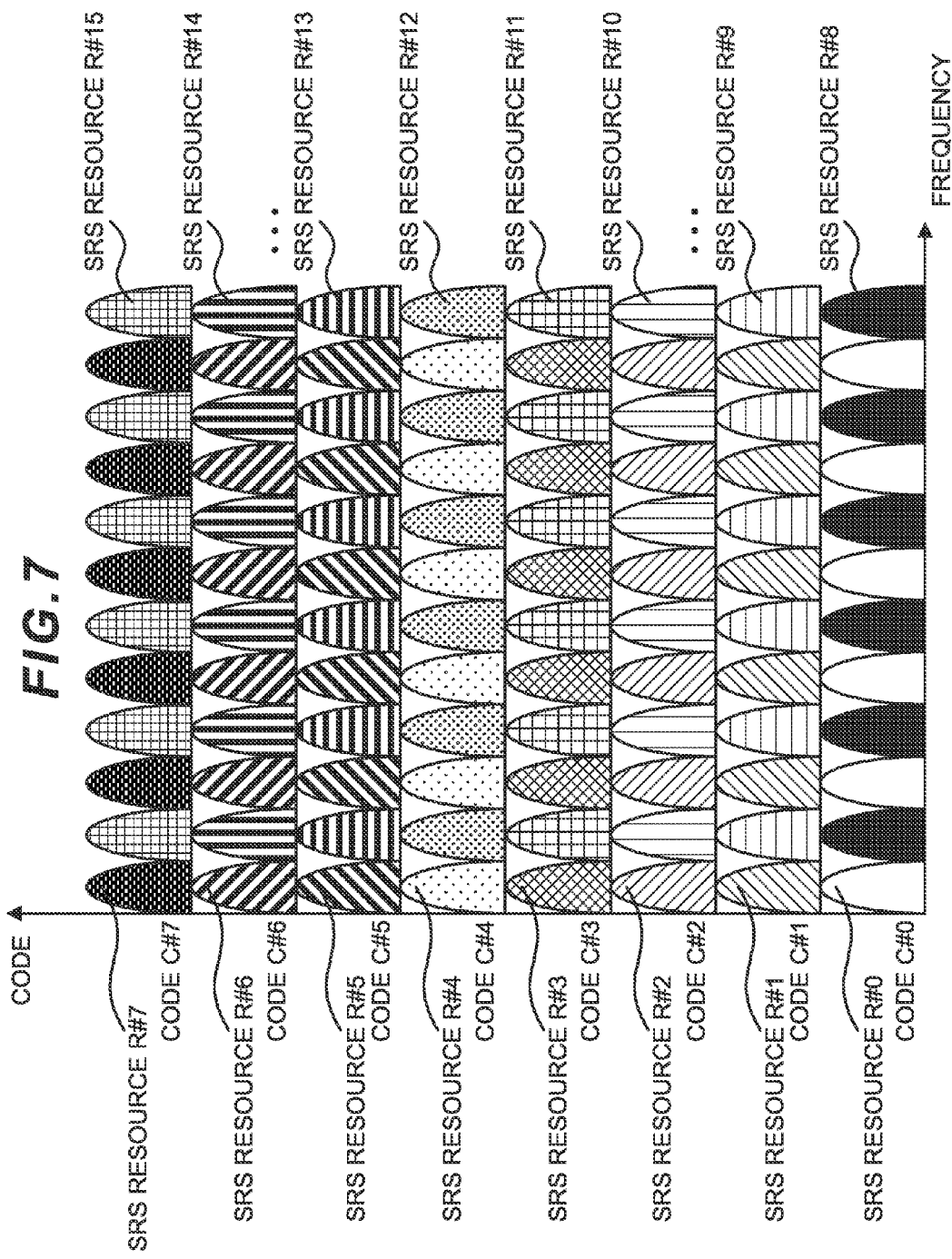
FIG. 7 is a diagram illustrating an example of uplink SRS resources according to the embodiment.

FIG. 7 is a diagram illustrating an SRS resource of an uplink. Here, the case of transmitting an SRS using resources specified using CDM and FDM (or IFDM) together will be described. Illustrated are SRS resources R#0 to 15 which are 16 SRS resources composed of two frequency resources which have a comb-shaped spectrum in a frequency domain and have a frequency shifted mutually by one subcarrier, and of 8 code resources corresponding to C#0 to 7 which are 8 codes. For every port, an SRS is transmitted using each one SRS resource. Here, as a code for the CDM, a sequence with a cyclic shift (CS) applied to a sequence becoming a reference, such as CAZAC (Constant Amplitude Zero Auto Correlation) sequence, for example, can be used.

FIG. 8 is a diagram illustrating an SRS resource group used for SRS transmission on 2 ports. Here, it is illustrated that an SRS resource of the same shaded pattern in a diagram constitutes one SRS resource group. Each SRS resource group is composed of 2 SRS resources used for SRS transmission of 2 ports of one mobile station apparatus 200. That is, any mobile station apparatus 200 transmits the SRS for 2 ports using any SRS resource group of SRS resource groups #0 to 7. In that case, each SRS for 2 ports is transmitted using each of 2 SRS resources constituting the SRS resource group to be used.

Then, a specifying method of an SRS resource in an example illustrated in FIG. 8 will be described. As a specifying method of a code resource corresponding to a port p of one mobile station apparatus 200, a sequence of length N: $r^{(\alpha(p))}_{u,v}(n)$ as illustrated by [Formula 37], (where, n=0, 1, 2, . . . , N−1) can be used.

[Formula 37]

$$r_{u,v}^{(\alpha(p))}(n) = e^{j\alpha(p)n} r_{u,v}^{0}(n) \quad (37)$$

Here, $r^0_{u,v}(n)$ is a sequence of length N becoming a reference, and α(p) is a value shown by [Formula 38], and indicates a CS in the port p.

[Formula 38]

$$\alpha(p) = 2\pi \frac{n_{SRS}^{cs,p}}{8} \quad (38)$$

Here, $n^{cs,p}_{SRS}$ is a quantity shown by [Formula 39], and a quantity individually set for the port p.

[Formula 39]

$$n_{SRS}^{cs,p} = \left(n_{SRS}^{cs} + \frac{8p}{N_p}\right) \bmod 8, \; p \in \{0, \ldots, N_p - 1\} \quad (39)$$

Here, $n^{cs}_{SRS}$ is a quantity set specifically to the mobile station apparatus 200, and is specified by SRS parameters. $N_p$ is the number of ports. That is, the base station apparatus 100 specifies $n^{cs}_{SRS}$ which is a parameter specific to the mobile station apparatus 200 and $r^0_{u,v}(n)$ which is a reference sequence, and thereby, the mobile station apparatus 200 can set a code resource corresponding to each port.

As a specifying method of a frequency resource corresponding to a port p of one mobile station apparatus 200, a frequency offset value $k^p_{TC}$ as shown by [Formula 40] can be used.

[Formula 40]

$$k_{TC}^p = k_{TC} \quad (40)$$

Here, $k_{TC}$ is a quantity set specifically to the mobile station apparatus 200, and is specified by SRS parameters. The $k_{TC}$ is also referred to as a transmission comb. The $k_{TC}$ is zero or one, and when a frequency offset value $k^p_{TC}$ is zero, Comb #0 which is the first comb-shaped spectrum is used, and when $k^p_{TC}$ is one, Comb #1 which is the Comb-shaped spectrum with a frequency offset by 1 subcarrier from Comb #0 is used. In an example of FIG. 8, since $k^p_{TC}$ is the same to all the ports p of one mobile station apparatus 200, the mobile station apparatus 200 uses the same frequency resource (comb-shaped spectrum) to all the ports. That is, the base station apparatus 100 specifies $k_{TC}$ which is a parameter specific to the mobile station apparatus 200, and thereby, the mobile station apparatus 200 can set a frequency resource corresponding to each port. Besides, here, the case where two types of comb-shaped spectrums corresponding to two types of frequency offset values are used as frequency resources has been described, but it is not limited to this. For example, in the case where m types of comb-shaped spectrums are used, the $k_{TC}$ may be made to take the values of 0, 1, 2, ..., m−1, and a comb-shaped frequency pitch may be made to be m subcarriers.

As mentioned above, the specifying method of SRS resources in an example illustrated in FIG. 8 specifies two code resources corresponding to each of 2 ports and one frequency resource which is used in common to 2 ports based on $n^{cs}_{SRS}$ and $r^0_{u,v}(n)$ and $k_{TC}$ which are set specifically to the mobile station apparatus 200.

FIG. 9 is a diagram illustrating an SRS resource group used for SRS transmission on 4 ports. Each SRS resource group is composed of 4 SRS resources used for SRS transmission of 4 ports of one mobile station apparatus 200. That is, any mobile station apparatus 200 transmits the SRS for 4 ports using any SRS resource group of SRS resource groups #0 to 4. In that case, each SRS for 4 ports is transmitted using each of 4 SRS resources constituting the SRS resource group to be used.

As for the specifying method of SRS resources in an example illustrated in FIG. 9, the same method as the specifying method of SRS resources in an example illustrated in FIG. 8 can be used. That is, the base station apparatus 100 specifies 4 code resources corresponding to each of 4 ports and one frequency resource which is used in common to 4 ports by specifying $n^{cs}_{SRS}$ and $r^0_{u,v}(n)$ and $k_{TC}$ which are set specifically to the mobile station apparatus 200, and by using Formulas (37) to (40).

FIG. 10 is a diagram illustrating other SRS resource groups used for SRS transmission on 4 ports. Each SRS resource group is composed of 4 SRS resources used for SRS transmission of 4 ports of one mobile station apparatus 200. That is, any mobile station apparatus 200 transmits the SRS for 4 ports using any resource group of SRS resource groups #0 to 3. In that case, each SRS for 4 ports is transmitted using each of 4 SRS resources constituting the SRS resource group to be used.

As for the specifying method of SRS resources in an example illustrated in FIG. 10, the same method as the specifying method of SRS resources in an example illustrated in FIG. 8 can be used with respect to specification of code resources. On the other hand, with respect to frequency resources, a comb-shaped spectrum used for every port is specified. More specifically, as a specifying method of frequency resources corresponding to a port p of one mobile station apparatus 200, a frequency offset value $k^p_{TC}$ as shown by [Formula 40] is used when a port p is zero or two, and a frequency offset value $k_{TC}$ as shown by [Formula 41] is used when a port p is one or three.

[Formula 41]

$$k_{TC}^p = 1 - k_{TC} \quad (41)$$

Here, the $k_{TC}$ is a value set specifically to the mobile station apparatus 200, and is specified by SRS parameters. The $k_{TC}$ is zero or one, and when a frequency offset value $k^p_{TC}$ is zero, Comb #0 which is the first comb-shaped spectrum is used, and when the $k^p_{TC}$ is one, Comb #1 which is a comb-shaped spectrum with a frequency offset by 1 subcarrier from Comb #0 is used. In a more general expression, as a specifying method of frequency resources corresponding to a port p of one mobile station apparatus 200, a frequency offset value $k^p_{TC}$ as shown by [Formula 42] is used.

[Formula 42]

$$k_{TC}^p = (k_{TC} + k_p) \bmod K \quad (42)$$

Here, K is the number of comb-shaped spectrums which have a different frequency offset value. As for $k_p$, a fixed value or a value calculated from p and K can be used for every port p.

That is, as a specifying method of SRS resources in an example shown in FIG. 10, the base station apparatus 100 specifies 4 code resources corresponding to each of 4 ports and 4 frequency resources corresponding to each of 4 ports by specifying $n^{cs}_{SRS}$, and $r^0_{u,v}(n)$ and $k_{TC}$ which are set specifically to the mobile station apparatus 200, and by using Formulas (37) to (40) and (41) (or Formulas (37) to (39) and (42)).

Here, in FIG. 8, since frequency resources used for SRS transmission on 2 ports in each SRS resource group are the same, complexity of scheduling of an SRS can be reduced. In addition, since an inter-code distance between these two resources is large, orthogonality between the SRS on 2 ports can be maintained even in circumstances where frequency selectivity is high.

In addition, in FIG. 9, since frequency resources used for SRS transmission on 4 ports in each SRS resource group are the same, the complexity of scheduling of an SRS can be reduced.

In addition, in FIG. 10, by determining, for every port, frequency resources used for SRS transmission on 4 ports in each SRS resource group, an inter-code distance between code resources can be made larger than that of the case of FIG. 9. In addition, since multiplexing based on a frequency offset has a robust resistance characteristic for frequency selectivity in comparison with code multiplexing, orthogonality among the SRS of 4 ports can be maintained even in circumstances where the frequency selectivity is high.

That is, by using a multiplexing method as illustrated in FIG. 11, setting of SRS transmission having a robust resistance characteristic for frequency selectivity can be performed while the complexity of scheduling is reduced. FIG. 11 is a diagram illustrating a combination of a multiplexing method of the SRS. In both of a cell which uses Normal CP used in circumstances where frequency selectivity is comparatively low and a cell which uses Extended CP used in circumstances where frequency selectivity is comparatively high, setting is carried out so that the SRS of 2 ports may be code-multiplexed for the mobile station apparatus 200 which transmits the SRS on 2 ports. In a cell which uses Normal CP, setting is carried out so that the SRS of 4 ports may be code-multiplexed for the mobile station apparatus 200 which transmits the SRS on 4 ports. On the other hand, in a cell which uses Extended CP, setting is carried out so that the SRS of 4 ports may be multiplexed using compositely the code multiplexing and the frequency multiplexing by a comb-shaped offset for the mobile station apparatus 200 which transmits the SRS on 4 ports.

In this way, multiplexing methods among ports of the SRS are switched in accordance with whether a cell is one which uses Normal CP used in circumstances where frequency selectivity is comparatively low, or one which uses Extended CP used in circumstances where frequency selectivity is comparatively high, and with the number of ports of the SRS to be transmitted (multiplexed). Thereby, it is possible to perform setting of SRS transmission so as to maintain the orthogonality of the SRS while reducing the complexity of scheduling.

The base station apparatus 100, based on an SRS transmitted from the mobile station apparatus 200, carries out scheduling of the mobile station apparatus 200, and can perform determination or the like of allocation of PUSCH resources and a modulation scheme and coding rate which are to be applied to a PUSCH, for example. That is, efficient scheduling for the mobile station apparatus 200 can be performed by the base station apparatus 100.

Besides, as for the SRS setting mentioned above, the effects described above can be acquired even in the case of being applied to any of an A-SRS and a P-SRS. In addition, by performing the SRS setting mentioned above for both an A-SRS and a P-SRS, a circuit scale used for SRS transmission/reception can be reduced.

(Second Embodiment)

A second embodiment according to the present invention will be described referring to drawings. A configuration example of a channel, a configuration example of a base station apparatus and a configuration example of a mobile station apparatus, according to the present embodiment, can use the same configurations as a configuration example of a channel, a configuration example of a base station apparatus and a configuration example of a mobile station apparatus, according to a first embodiment as illustrated in Diagrams 1 to 3.

FIG. 12 is a diagram illustrating an example of setting of a function of transmission antenna selection according to a second embodiment of the present invention. One mobile station apparatus 200 transmits a PUSCH using a mode of either a single antenna port mode (SAPM) in which a PUSCH is transmitted using 1 port or a multiple antenna port mode (MAPM) in which a PUSCH can be transmitted using two or more ports.

The mobile station apparatus 200 which has a plurality of transmission antennas transmits the SRS of a plurality of transmission antennas using TDM in a SAPM. More specifically, the mobile station apparatus 200 transmits the SRS from different transmission antennas using an SRS SC-FDMA symbol of a different sub-frame. The base station apparatus 100 measures the SRS, and specifies by which transmission antenna a PUSCH is to be transmitted, using a PUCCH indicating allocation of a PUSCH. In this case, the base station apparatus 100 specifies which transmission antenna is to be used, using a bit sequence of CRC (Cyclic Redundancy Check) applied to a PUCCH. However, the mobile station apparatus 200 specifies individually whether or not to use this function of transmission antenna selection.

That is, in the mobile station apparatus 200 which uses a function of transmission antenna selection, in the case of transmitting a single port transmission SRS, the base station apparatus 100 sets SRS TDM multiplexing with a function of transmission antenna selection ON, and in the mobile station apparatus 200 which does not use a function of transmission antenna selection, in the case of transmitting a single port transmission SRS, the base station apparatus 100 does not set SRS TDM multiplexing with a function of transmission antenna selection OFF. In the same way, in the mobile station apparatus 200 which uses a function of transmission antenna selection, the base station apparatus 100 performs specifying a transmission antenna by CRC with a function of transmission antenna selection ON, and in the mobile station apparatus 200 which does not use a function of transmission antenna selection, in the case of transmitting a single port transmission SRS, the base station apparatus 100 does not performs specifying a transmission antenna by CRC with a function of transmission antenna selection OFF.

On the other hand, without depending on whether the mobile station apparatus 200 uses a function of transmission antenna selection, or not, in the case of transmitting a plural port transmission SRS, the base station apparatus 100 does not set SRS TDM multiplexing with a function of transmission antenna selection OFF. In the same way, in the case of transmitting a plural port transmission SRS, the base station apparatus 100 does not perform specifying a transmission antenna by CRC with a function of transmission antenna selection OFF.

Thereby, since the function can be made to be ON only when a single port transmission where a function of transmission antenna selection operates efficiently, efficient communication can be performed.

(a) The present embodiment can also take the following aspects. That is, a base station apparatus of the present embodiment is the base station apparatus which communicates with a mobile station apparatus, wherein the base station apparatus receives information which specifies the number of transmission ports from the mobile station apparatus, and measures a sounding reference signal, for every the transmission port, multiplexed by a multiplexing method set in accordance with the number of the transmission ports.

Thereby, it is possible to perform setting of an efficient sounding reference signal multiplexing method in accordance with the number of transmission ports.

(b) A base station apparatus of the present embodiment is the one, wherein communication is performed using a cyclic prefix longer than a normal cyclic prefix.

Thereby, it is possible to perform setting of a multiplexing method such that orthogonality of a sounding reference signal may be maintained in circumstances where frequency selectivity is high.

(c) A base station apparatus of the present embodiment is the one, wherein when the transmission ports are smaller than a prescribed value, the code-multiplexed sounding reference signal is measured.

Thereby, in circumstances where an inter-code distance of the code-multiplexed sounding reference signal is long, it is possible to perform efficient scheduling of a sounding reference signal.

(d) A base station apparatus of the present embodiment is the one, wherein the sounding reference signal code-multiplexed by a cyclic shift is measured.

Thereby, it possible to use a code having high performance (e) A base station apparatus of the present embodiment is the one, wherein when the transmission ports are larger than a prescribed value, the code-multiplexed and frequency-multiplexed sounding reference signal is measured.

Thereby, it is possible to perform setting a multiplexing method such that orthogonality of a sounding reference signal may be maintained in circumstances where frequency selectivity is high.

(f) A base station apparatus of the present embodiment is the one, wherein measured is the sounding reference signal multiplexed by using code division multiplexing based on a cyclic shift and frequency division multiplexing based on a frequency offset of a comb-shaped spectrum.

Thereby, while orthogonality of a sounding reference signal is maintained in circumstances where frequency selectivity is high, it is possible to use a code having high performance.

(g) A mobile station apparatus of the present embodiment is the one which communicates with a base station apparatus, wherein the mobile station apparatus notifies the base station apparatus of information which specifies the number of transmission ports, and sets a multiplexing method of a sounding reference signal for every the transmission port in accordance with the number of the transmission ports, and transmits the sounding reference signal multiplexed by using the multiplexing method.

Thereby, it is possible to perform setting of an efficient sounding reference signal multiplexing method in accordance with the number of transmission ports.

(h) A mobile station apparatus of the present embodiment is the one, wherein in the case where the transmission ports are fewer than a prescribed value, the sounding reference signal is multiplexed by code division multiplexing.

Thereby, in circumstances where an inter-code distance of code-multiplexed the sounding reference signal is long, it is possible to perform efficient scheduling of a sounding reference signal.

(i) A mobile station apparatus of the present embodiment is the one, wherein the sounding reference signal multiplexed using code division multiplexing based on a cyclic shift is transmitted.

Thereby, it is possible to use a code having high performance.

(j) A mobile station apparatus of the present embodiment is the one, wherein when the transmission ports are larger than a prescribed value, the sounding reference signal is multiplexed by code division multiplexing and frequency division multiplexing.

Thereby, it is possible to perform setting a multiplexing method such that orthogonality of a sounding reference signal may be maintained in circumstances where frequency selectivity is high.

(k) A mobile station apparatus of the present embodiment is the one, wherein the sounding reference signal is multiplexed using code multiplexing based on a cyclic shift, and frequency multiplexing based on a frequency offset of a comb-shaped spectrum.

Thereby, while orthogonality of a sounding reference signal is maintained in circumstances where frequency selectivity is high, it is possible to use a code having high performance.

(l) A mobile station apparatus of the present embodiment is the one, wherein a cyclic prefix which the base station apparatus uses is discriminated, and in accordance with whether the discriminated cyclic prefix is a normal cyclic prefix or a cyclic prefix longer than a normal cyclic prefix, a multiplexing method of a sounding reference signal for every the transmission port is set.

Thereby, in accordance with frequency selectivity, while orthogonality of a sounding reference signal is maintained, it is possible to use a code having high performance.

(m) A mobile station apparatus of the present embodiment is the one, wherein when the discriminated cyclic prefix is a normal cyclic prefix, the sounding reference signal is multiplexed by code multiplexing.

Thereby, in accordance with frequency selectivity, while orthogonality of a sounding reference signal is maintained, it is possible to use a code having high performance.

(n) A mobile station apparatus of the present embodiment is the one, wherein when the discriminated cyclic prefix is a longer cyclic prefix than a normal cyclic prefix, the sounding reference signal is multiplexed by code multiplexing and frequency multiplexing.

Thereby, when frequency selectivity is high, it is possible to maintain orthogonality of a sounding reference signal.

(o) A communication system of the present embodiment is the one which performs communication between a mobile station apparatus and a base station apparatus, wherein the mobile station apparatus notifies the base station apparatus of information which specifies the number of transmission ports, and discriminates whether the discriminated cyclic prefix is a normal cyclic prefix or a cyclic prefix longer than a normal cyclic prefix, and in accordance with the number of the transmission ports and the discriminated result, sets a multiplexing method of a sounding reference signal for every the transmission port, and transmits the sounding reference signal multiplexed using the multiplexing method, and the base station apparatus receives information which specifies the number of the transmission ports, and measures a sounding reference signal for every the transmission port.

Thereby, in accordance with the number of transmission ports and frequency selectivity, while orthogonality of a sounding reference signal is maintained, it is possible to perform efficient scheduling of an sounding reference signal.

(p) A communication method of the present embodiment is the one in a base station apparatus which performs communication with a mobile station apparatus, and includes the steps of: receiving information which specifies the number of transmission ports from the mobile station apparatus; and measuring a sounding reference signal, for every the transmission port, multiplexed by a multiplexing method set in accordance with the number of the transmission ports.

Thereby, in accordance with the number of transmission ports, while orthogonality of a sounding reference signal is maintained, it is possible to perform efficient scheduling of a sounding reference signal.

(q) A communication method of the present embodiment is the one in a mobile station apparatus which performs communication with a base station apparatus, and includes the steps of: notifying the base station apparatus of information which specifies the number of transmission ports; and setting a multiplexing method of a sounding reference signal for every the transmission port in accordance with the number of the transmission ports, and transmitting the sounding reference signal multiplexed using the multiplexing method.

Thereby, in accordance with the number of transmission ports, while orthogonality of a sounding reference signal is maintained, it is possible to perform efficient scheduling of a sounding reference signal.

Each embodiment described above is applied also to an integrated circuit/chip set mounted in the base station apparatus 100 and the mobile station apparatus 200. In addition, in embodiments described above, by recording a program for realizing each function in the base station apparatus 100 and each function in the mobile station apparatus 200 on a computer-readable recording medium, and by making the program recorded on the recording medium be read into a computer system and executed, control of the base station apparatus 100 and the mobile station apparatus 200 may be performed. Besides, it is assumed that the "computer system" mentioned here includes an OS and hardware such as a peripheral device.

In addition, the "computer-readable recording medium" is referred to as a flexible disk, a magnetic-optical disk, a ROM, a portable medium such as a CD-ROM, and a storage device such as a hard disk built-in in a computer system. In addition, it is assumed that the "a computer-readable recording medium" also includes one which holds a program dynamically in a short period of time like a communication line in the case of transmitting a program via a network such as the Internet and a communication channel such as a telephone line, and one which holds a program in a certain period of time like a volatile memory inside a computer system used as a server or a client in that case. The above-mentioned program may be one for realizing a part of function mentioned above, and may be one which can be realized in combination with a program with a function mentioned above already recorded in a computer system.

As mentioned above, an embodiment of this invention has been described in reference to diagrams. A specific configuration is not limited to the embodiment, and a design or the like in a range which does not depart from the gist of this invention is included in the scope of claims. As for the present invention, various modifications are possible in the scope indicated in Claims, and an embodiment acquired by combining suitably technical means each disclosed in a different embodiment is also included in the technical scope of the present invention. Also included is a configuration where elements which are described in each above-mentioned embodiment, and which perform the same effect are replaced mutually.

INDUSTRIAL APPLICABILITY

The present invention is used preferably for a radio base station apparatus, a radio mobile station apparatus, a radio communication system, or a radio communication method.

DESCRIPTION OF SYMBOLS

100 Base station apparatus
101 Data control part
102 Transmission data modulation part
103 Radio part
104 Scheduling section
105 Channel estimation part
106 Reception data demodulation part
107 Data extraction part
108 Higher layer
109 Antenna
110 Radio resource control part
200 Mobile station apparatus
201 Data control part
202 Transmission data modulation part
203 Radio part
204 Scheduling section
205 Channel estimation part
206 Reception data demodulation part
207 Data extraction part
208 Higher layer
209 Antenna
210 Radio resource control part
501, 502, 503, and 504 Transmission antenna port
505, 506, 507, 508 SRS

The invention claimed is:

1. A mobile station apparatus configured to communicate with a base station apparatus, the mobile station apparatus comprising:
   a receiving unit configured to receive information for indicating a number of one or more antenna ports being used for transmission of one or more sounding reference signals; and
   a transmitting unit configured to determine a number of sequences being generated for the one or more sounding reference signals in accordance with the number of one or more antenna ports set based on the information in a case that the information is set.

2. The mobile station apparatus according to claim 1, wherein
   the transmitting unit is configured to:
      determine an antenna port p for transmitting the one or more sounding reference signals in accordance with the number of one or more antenna ports; and
      generate the sequences corresponding to the antenna port p.

3. The mobile station apparatus according to claim 2, wherein
   the transmitting unit is configured to generate, based on an index of the antenna port p and the number of one or more antenna ports, the sequences corresponding to the antenna port p in a case that the number of one or more antenna ports is set based on the information.

4. The mobile station apparatus according to claim 2, wherein
   in a case that the number of the one or more antenna ports is x, x set of sequences is set, and
   x is equal to or greater than 1.

5. A base station apparatus configured to communicate with a mobile station apparatus, the base station apparatus comprising:
   a transmitting unit configured to transmit, to the mobile station apparatus, information indicating a number of one or more antenna ports being used for transmission of one or more sounding reference signals; and
   a receiving unit configured to:
      determine a number of sequences for the one or more sounding reference signals generated by the mobile station apparatus in accordance with the number of one or more antenna ports based on the information transmitted to the mobile station apparatus; and decode, based on the determined number of sequences, the sequences for the one or more sounding reference signals transmitted from the mobile station apparatus.

6. The base station apparatus according to claim 5, wherein the receiving unit is configured to determine an antenna port p on which the sounding reference signal is transmitted in accordance with the number of one or more antenna ports, the sequences corresponding to the antenna port p is set.

7. The base station apparatus according to claim 6, wherein the receiving unit is configured to decode, based on an index of the antenna port p and the number of one or more antenna ports, the sequences for the sounding reference signal transmitted from the mobile station apparatus in a case that the information is transmitted to the mobile station apparatus.

8. The base station apparatus according to claim 6, wherein in a case that the number of the one or more antenna ports is x, x set of sequences is set, and x is equal to or greater than 1.

9. A method in a mobile station apparatus configured to communicate with a base station apparatus, the method comprising:

receiving information for indicating a number of one or more antenna ports being used for transmission of one or more sounding reference signals; and determining the number of sequences being generated for the sounding reference signal in accordance with the number of one or more antenna ports set based on the information in a case that the information is set.

10. The method according to claim 9, further comprising:

determining an antenna port p for transmitting the one or more sounding reference signals in accordance with the number of one or more antenna ports; and generating the sequences corresponding to the antenna port p.

11. The method according to claim 10, further comprising:

generating, based on an index of the antenna port p and the number of one or more antenna ports, the sequences corresponding to the antenna port p in a case that the number of one or more antenna ports is set based on the information.

12. A method in a base station apparatus configured to communicate with a mobile station apparatus, the method comprising:

transmitting, to the mobile station apparatus, information indicating a number of one or more antenna ports being used for transmission of one or more sounding reference signals; and determining a number of sequences for the sounding reference signal generated by the mobile station apparatus in accordance with the number of one or more antenna ports based on the information transmitted to the mobile station apparatus; and decoding, based on the determined number of sequences, the sequences for the one or more sounding reference signals transmitted from the mobile station apparatus.

13. The method according to claim 12, further comprising:

determining an antenna port p on which the one or more sounding reference signals is transmitted in accordance with the number of one or more antenna ports, and the sequences corresponding to the antenna port p is set.

14. The method according to claim 13, further comprising:

decoding, based on an index of the antenna port p and the number of one or more antenna ports, the sequences for the one or more sounding reference signals transmitted from the mobile station apparatus in a case that the information is transmitted to the mobile station apparatus.

15. An integrated circuit in a mobile station apparatus configured to communicate with a base station apparatus, the integrated circuit comprising:

circuitry configured to:

receive information for indicating a number of one or more antenna ports being used for transmission of one or more sounding reference signals; and determine a number of sequences being generated for the one or more sounding reference signals in accordance with the number of one or more antenna ports set based on the information in a case that the information is set.

16. The integrated circuit according to claim 15, wherein the circuitry is further configured to:

determine an antenna port p for transmitting the one or more sounding reference signals in accordance with the number of one or more antenna ports; and generate the sequences corresponding to the antenna port p.

17. The integrated circuit according to claim 16, wherein the circuitry is further configured to:

generate, based on an index of the antenna port p and the number of one or more antenna ports, the sequences corresponding to the antenna port p in a case that the number of one or more antenna ports is set based on the information.

18. An integrated circuit in a base station apparatus configured to communicate with a mobile station apparatus, the integrated circuit comprising:

circuitry configured to:

transmit, to the mobile station apparatus, information indicating a number of one or more antenna ports being used for transmission of one or more sounding reference signals;

determine a number of sequences for the one or more sounding reference signals generated by the mobile station apparatus in accordance with the number of one or more antenna ports based on the information transmitted to the mobile station apparatus; and decode, based on the determined number of sequences, the sequences for the one or more sounding reference signals transmitted from the mobile station apparatus.

19. The integrated circuit according to claim 18, wherein the circuitry is further configured to:

receive information for indicating a number of one or more antenna ports being used for transmission of one or more sounding reference signals; and determine the number of sequences being generated for the one or more sounding reference signals in accordance with the number of one or more antenna ports set based on the information.

20. The integrated circuit according to claim 19, wherein the circuitry is further configured to:

decode, based on an index of the antenna port p and the number of one or more antenna ports, the sequences for the one or more sounding reference signals transmitted from the mobile station apparatus in a case that the information is transmitted to the mobile station apparatus.

* * * * *